United States Patent
Du et al.

(10) Patent No.: US 11,671,327 B2
(45) Date of Patent: *Jun. 6, 2023

(54) IOT DEVICE GROUPING AND LABELING

(71) Applicant: Palo Alto Networks, Inc., Santa Clara, CA (US)

(72) Inventors: Jun Du, Cupertino, CA (US); Gong Cheng, Sunnyvale, CA (US); Yilin Zhao, San Jose, CA (US); Pui-Chuen Yip, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,682

(22) Filed: Jun. 21, 2021

(65) Prior Publication Data

US 2021/0314229 A1  Oct. 7, 2021

Related U.S. Application Data

(63) Continuation of application No. 15/894,861, filed on Feb. 12, 2018, now Pat. No. 11,082,296.

(Continued)

(51) Int. Cl.
*H04L 41/0893* (2022.01)
*H04L 67/12* (2022.01)
(Continued)

(52) U.S. Cl.
CPC ...... *H04L 41/0893* (2013.01); *H04L 12/4641* (2013.01); *H04L 41/065* (2013.01);
(Continued)

(58) Field of Classification Search
None
See application file for complete search history.

(56) References Cited

U.S. PATENT DOCUMENTS 6,142,682 A   11/2000  Skogby
6,877,146 B1  4/2005   Teig
(Continued)

FOREIGN PATENT DOCUMENTS

CN  102025577  7/2012
CN  107862468  3/2018
(Continued)

OTHER PUBLICATIONS

Charyyev et al., Locality-Sensitive IoT Network Tiaffic Fingerprinting for Device Identification, IEEE Internet of Things Journal, 2020, vol. 8, No. 3, pp. 1272-1281.
(Continued)

*Primary Examiner* — Robert M Morlan
(74) *Attorney, Agent, or Firm* — Van Pelt, Yi & James LLP

(57) ABSTRACT

Techniques for grouping and labeling Internet of Things (IoT) devices are disclosed. A set of raw events associated with a first IoT device is identified. A context of the first IoT device is identified, and used to enrich at least some of the raw events. At least some of the raw events are aggregated. A context-based IoT device grouping model is generated based at least in part on the aggregated events and events associated with a second IoT device in operation. The model is applied to determine that a third IoT device belongs to a particular group. A deviation by the third IoT device from group behavior is detected and an alert is generated in response.

21 Claims, 18 Drawing Sheets

Related U.S. Application Data

(60) Provisional application No. 62/578,266, filed on Oct. 27, 2017.

(51) Int. Cl.

| | | |
|---|---|---|
| *H04L 41/14* | (2022.01) | |
| *H04L 41/0816* | (2022.01) | |
| *H04L 41/0631* | (2022.01) | |
| *H04W 4/06* | (2009.01) | |
| *H04L 12/46* | (2006.01) | |
| *H04L 41/069* | (2022.01) | |
| *H04W 4/70* | (2018.01) | |

(52) U.S. Cl.
CPC ........ *H04L 41/069* (2013.01); *H04L 41/0816* (2013.01); *H04L 41/145* (2013.01); *H04L 67/12* (2013.01); *H04W 4/06* (2013.01); *H04W 4/70* (2018.02)

(56) References Cited

U.S. PATENT DOCUMENTS

| | | |
|---|---|---|
| 8,146,133 B2 | 3/2012 | Moon |
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,874,550 B1 | 10/2014 | Soubramanien |
| 8,891,528 B2 | 11/2014 | Moriarty |
| 8,898,788 B1 | 11/2014 | Aziz |
| 8,973,088 B1 | 3/2015 | Leung |
| 9,324,119 B2 | 4/2016 | Singh |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,661,011 B1 | 5/2017 | Van Horenbeeck |
| 9,692,784 B1 | 6/2017 | Nenov |
| 9,774,604 B2 | 9/2017 | Zou |
| 9,891,907 B2 | 2/2018 | Searle |
| 9,961,096 B1 | 5/2018 | Pierce |
| 9,984,344 B2 | 5/2018 | Singh |
| 10,038,700 B1 | 7/2018 | Duchin |
| 10,043,591 B1 | 8/2018 | Laborde |
| 10,122,747 B2 | 11/2018 | Mahaffey |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,623,389 B2 | 4/2020 | Childress |
| 10,630,728 B2 | 4/2020 | Ghosh |
| 10,764,315 B1 | 9/2020 | Carroll |
| 10,885,393 B1 | 1/2021 | Sirianni |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,455,641 B1 | 9/2022 | Shahidzadeh |
| 2004/0243835 A1 | 12/2004 | Terzis |
| 2006/0265397 A1 | 11/2006 | Bryan |
| 2008/0059536 A1 | 3/2008 | Brock |
| 2010/0284282 A1 | 11/2010 | Golic |
| 2012/0065749 A1 | 3/2012 | Hunter |
| 2012/0102543 A1 | 4/2012 | Kohli |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1 | 9/2013 | Spurlock |
| 2013/0305357 A1 | 11/2013 | Ayyagari |
| 2014/0006479 A1 | 1/2014 | Maloo |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0229654 A1 | 8/2015 | Perier |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2015/0324559 A1 | 11/2015 | Boss |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0173446 A1 | 6/2016 | Nantel |
| 2016/0173495 A1 | 6/2016 | Joo |
| 2016/0182497 A1 | 6/2016 | Smith |
| 2016/0196558 A1 | 7/2016 | Mercille |
| 2016/0212099 A1 | 7/2016 | Zou |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0230402 A1 | 8/2017 | Greenspan |
| 2017/0232300 A1 | 8/2017 | Tran |
| 2017/0235585 A1 | 8/2017 | Gupta |
| 2017/0235783 A1 | 8/2017 | Chen |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1 | 10/2017 | C |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0139227 A1 | 5/2018 | Martin |
| 2018/0144139 A1 | 5/2018 | Cheng |
| 2018/0191729 A1 | 7/2018 | Whittle |
| 2018/0191746 A1 | 7/2018 | De Knijf |
| 2018/0191848 A1 | 7/2018 | Bhattacharya |
| 2018/0205793 A1 | 7/2018 | Loeb |

(56) References Cited

U.S. PATENT DOCUMENTS

| | | |
|---|---|---|
| 2018/0212768 A1 | 7/2018 | Kawashima |
| 2018/0234302 A1 | 8/2018 | James |
| 2018/0234519 A1 | 8/2018 | Boyapalle |
| 2018/0248902 A1 | 8/2018 | Mircea |
| 2018/0255084 A1 | 9/2018 | Kotinas |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0349598 A1 | 12/2018 | Harel |
| 2018/0349612 A1 | 12/2018 | Harel |
| 2018/0357556 A1 | 12/2018 | Rai |
| 2018/0375887 A1 | 12/2018 | Dezent |
| 2019/0019249 A1 | 1/2019 | Bhattacharjee |
| 2019/0081961 A1 | 3/2019 | Bansal |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0138512 A1 | 5/2019 | Pourmohammad |
| 2019/0182278 A1 | 6/2019 | Das |
| 2019/0268305 A1 | 8/2019 | Xu |
| 2019/0349426 A1 | 11/2019 | Smith |
| 2019/0361917 A1 | 11/2019 | Tran |
| 2019/0373472 A1 | 12/2019 | Smith |
| 2019/0387399 A1 | 12/2019 | Weinberg |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0177485 A1 | 6/2020 | Shurtleff |
| 2020/0177589 A1 | 6/2020 | Mangalvedkar |
| 2020/0213146 A1 | 7/2020 | Kodam |
| 2020/0409957 A1 | 12/2020 | Zhang |

FOREIGN PATENT DOCUMENTS

| | | |
|---|---|---|
| CN | 108650133 | 10/2018 |
| CN | 107135093 | 5/2020 |
| EP | 3136297 | 3/2017 |
| JP | 2018513467 | 5/2018 |
| WO | 2019218874 | 11/2019 |

OTHER PUBLICATIONS

Du et al., A Lightweight Flow Feature-Based IoT Device Identification Scheme, Security and Communication Networks, 2022.

Zhao et al., A Few-Shot Learning Based Approach to IoT Traffic Classification, IEEE Communications Letters, 2021.

Al-Shaer et al., Design and Implementation of Firewall Policy Advisor Tools, 2002.

Al-Shaer et al., Firewall Policy Advisor for Anomaly Discovery and Rule Editing, Integrated Network Management VIII, 2003.

Martin et al., Requirements and Recommendations for CWE Compatibility and CWE Effectiveness, Version 1.0, Jul. 28, 2011.

National Electrical Manufacturers Association, Manufacturer Disclosure Statement for Medical Device Security, HIMSS/NEMA Standard HN Jan. 2013, 2013.

Author Unknown, Cisco Encrypted Traffic Analytics, Feb. 10, 2021.

Arash Fasihi, Rule Based Inference and Action Selection Based on Monitoring Data in IoT, Dec. 1, 2015.

Cramer et al., Detecting Anomalies in Device Event Data in the IoT, Proceedings of the 3td International Conference an Internet of Things, Big Data and Security, Mar. 21, 2018, pp. 52-62.

Midi et al., Kalis—A System for Knowledge-driven Adaptable Intrusion Detection for the Internet of Things, 2017 IEEE 37th International Conference on Distributed Computing Systems, pp. 656-666.

Blackstock et al., IoT Interoperability: A Hub-based Approach, 2014, IEEE International Conference on the Internel of Things (IOT), pp. 80-84.

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion dated Jul. 7, 2016.

Li et al., A Distributed Consensus Algorithm for Decision Making in Service-Oriented Internet of Things, Old Dominion University, ODU Digital Commons, 2014.

Liu et al., A Lightweight Anomaly Mining Algorithm in the Internet of Things, 2014 IEEE 5th International Conference an Software Engineering and Service Science, 2014, pp. 1142-1145.

Miloslavskaya et al., Ensuring Information Security for Internet of Things, 2017, IEEE 5th International Conference of Future Internet of Things and Cloud, pp. 62-69.

Nguyen et al., A Software-Defined Model for IoT Clusters: Enabling Applications on Demand, Faculty of Engineering and IT, University of Technology Sydney, Australia, IEEE Xplore, Apr. 23, 2018.

Sivanathan et al.. Classifying IoT Devices in Smart Environments Using Network Traffic Characteristics, IEEE, TMC, No. 8, pp. 1745-1759, Aug. 2018.

Sivanathan et al., Detecting Behavioral Change of IoT Devices Using Clustering-Based Network Traffic Modeling, IEEE LCN 2019, Mar. 30, 2020.

Sivanathan et al., Inferring IoT Device Types from Network Behavior Using Unsupervised Clustering, IEEE ICN 2019, Oct. 2019.

Charu C. Aggarwal, Outlier Analysis, Retrieved from the Internet, URL: https://web.archive.org/web/20130210212057/http://charuaggarwal.net/outlierbook.pdf.

Hirofumi Nakaoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.

Chen et al., A Model-Based Validated Autonomic Approach to Self-Protect Computing Systems, IEEE Internet of Things Journal, Oct. 2014, pp. 446-460, vol. 1, No. 5.

IOT DEVICE GROUPING AND LABELING

CROSS-REFERENCE TO RELATED APPLICATIONS

This application is a continuation of U.S. patent application Ser. No. 15/894,861, entitled IOT DEVICE GROUPING AND LABELING filed Feb. 12, 2018, which claims priority to U.S. Provisional Patent Application No. 62/578,266, filed Oct. 27, 2017, each of which is incorporated by reference herein.

DETAILED DESCRIPTION

Figure 1:
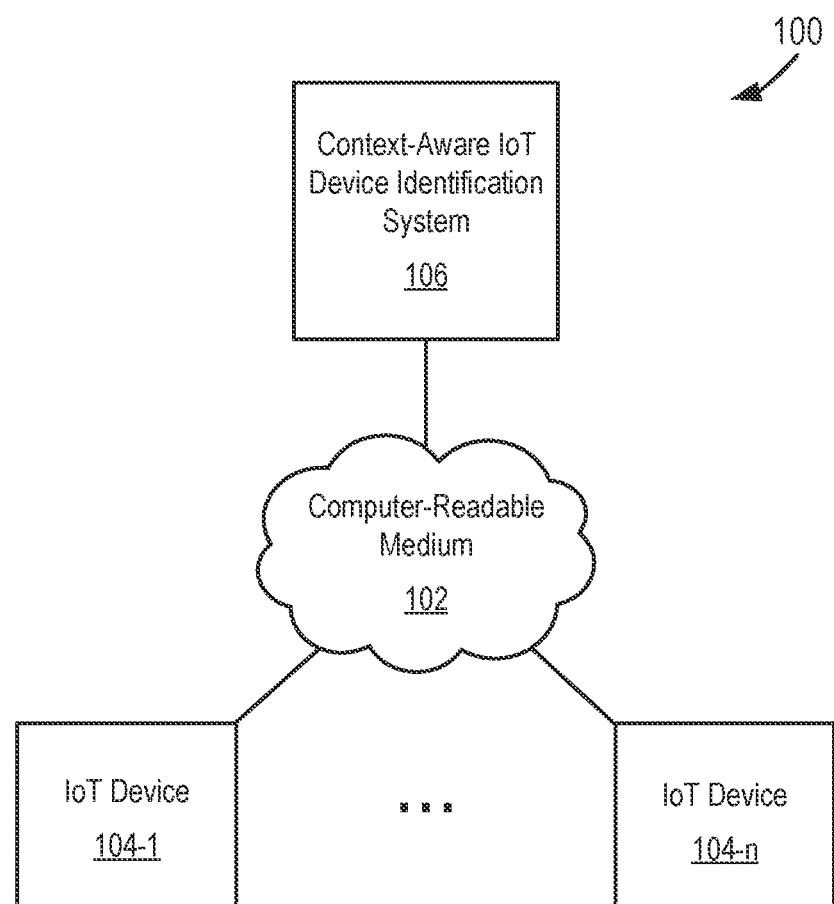
FIG. 1 depicts a diagram of an example of a system for providing context-aware Internet of Things (IoT) identification.

FIG. 1 depicts a diagram 100 of an example of a system for identifying Internet of Things (IoT) devices. The system of the example of FIG. 1 includes a computer-readable medium 102, IoT device 104-1 ... 104-n (hereinafter referred to as "IoT devices 104") coupled to the computer-readable medium 102, and a context-aware IoT device identification system 106.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. A cloud-based engine uses remote or hosted computing resources with a middle layer to hide hardware details. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent devices with wired or wireless interfaces through which the IoT devices 104 can send and receive data over wired and wireless connections, more specifically, devices purposely built or specifically purposed device with predictable or stable behavior patterns. Examples of IoT devices include thermostats, mobile devices, biological managers, sensory devices, and functionality performing devices. The IoT devices 104 can include unique identifiers which can be used in the transmission of data through a network. Unique identifiers of the IoT devices 104 can include identifiers created in accordance with Internet Protocol version 4 (hereinafter referred to as "IPv4") or identifiers created in accordance with Internet Protocol version 6 (hereinafter referred to as "IPv6"), of which both protocol versions are hereby incorporated by reference. Instead or in addition, a unique identifier can include a MAC address or a portion thereof. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 104 are purposefully built or configured IoT devices. In being purposely built IoT devices, the IoT devices 104 are built to have specific operational parameters. For example, a thermometer may be built to provide signals from a temperature sensor. In being purposely configured IoT devices, the IoT devices 104 can be configured to operate according to specific operational parameters in accordance with input from a human or artificial agent. For example, an IoT device of the IoT devices 104 can be a thermostat configured to control an air conditioner to cool a room to a configurable temperature at a configurable time. As another example, an agent can specify an IoT device should not communicate with a specific data source, and the IoT device can be configured to refrain from communicating with the specific data source as part of purposeful configuration.

In the example system 100 shown in FIG. 1, the context-aware IoT device identification system 106 is intended to represent a system that understands domain-specific context and uses machine learning to generate additional domain knowledge. A context of an IoT device, as used herein, includes IoT device profiles, IoT device categories, applicable operational parameters of an IoT device in operation, to name a few. For example, an IoT device can be profiled as a thermostat, categorized as a General Electric product, and a context of the IoT device can include an ID of the IoT device, sources (or paths) of messages to the IoT device, destinations (or paths) of messages from the IoT device, current operational parameters of the IoT device, e.g. how an IoT device operates in controlling itself, behaviors of an IoT device in operation, whether an IoT device is actually operating, data ports used by an IoT device in sending and receiving data, types of data sent or received, operating systems used by an IoT device, applications used by an IoT device, a hostname, finger print (e.g., Dynamic Host Configuration Protocol (DHCP) finger print), user agent, a specific field in a specific application header, MAC address (e.g., organizational unique identifier (OUI)), communication between an IoT device and its controller located remotely, and so on. Further, a context of an IoT device can include applicable operational parameters of an IoT device in operation to either or both access network services and broadcast. For example, a context of an IoT device can include a message an IoT device broadcasts in acting as a beacon. In another example, a context of an IoT device can include a data source with which an IoT device communicates through a WAN.

In a specific implementation, at least a portion of the context-aware IoT device identification system 106 is implemented remote relative to IoT devices 104 for which the system determines labeling of the IoT devices 104. For example, at least a portion of the context-aware IoT device identification system 106 can be implemented as cloud based systems. Portions of the context-aware IoT device identification system 106 implemented remote relative to IoT devices 104 can receive data associated with the IoT devices 104 through virtual private network (hereinafter "VPN") tunnels. For example, the context-aware IoT device identification system 106 can receive outbound network traffic sent from IoT devices 104 over a VPN tunnel. Additionally, VPN tunnels through which the context-aware IoT device identification system 106 can send and receive data can be maintained using dedicated networking equipment. For example, the context-aware IoT device identification system 106 can receive data associated with the IoT devices 104 using dedicated routers for communicating with the IoT devices 104.

Instead or in addition, at least a portion of the context-aware IoT device identification system 106 can be implemented through one or more local agents. A local agent includes software implemented on a physical device locally coupled to IoT devices 104. Local coupling involves operationally connecting the local agent via a LAN interface (or a smaller network interface, such as a PAN interface) to IoT devices 104 or listening to a mirror port of a switch operationally connected to the IoT device network. It should be noted that enterprise networks can include geographically distributed LANs coupled across WAN segments. In a distributed enterprise network, the local agents may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here). Depending upon implementation-specific or other considerations, the context-aware IoT device identification system 106 can include wired communication interfaces and wireless communication interfaces for communicating over wired or wireless communication channels. The context-aware IoT device identification system 106 can be, at least in part, a device provided by an Internet service provider directly purchased by a consumer and acting as a conduit between networks. Depending upon implementation or other considerations, the context-aware IoT device identification system 106 can be implemented as part of a private cloud. A private cloud implementing the context-aware IoT device identification system 106, at least in part, can be specific to an entity.

In a specific implementation, the IoT device identification system 106 functions to perform grouping/labeling of IoT devices 104, based on events. It may be noted that an IoT device 104 with a certain personality can be categorized into a certain group and an IoT device 104 without the certain personality can be categorized in a different group. As used in this paper, a personality includes mathematically modelled behavior patterns, with institutional knowledge built into the personality model.

In a specific implementation, the IoT device identification system 106 can determine events based on messages transmitted by or to an IoT device 104. For example, the IoT device identification system 106 can translate one or a plurality data packets (e.g., header) transmitted by or to an IoT device 104 into events which can subsequently be used to determine a grouping/labeling of the IoT device 104. As another example, the IoT device identification system 106 can correlate one or a plurality of data packets (e.g., header) transmitted by or to an IoT device 104 to an event of a specific application being executed on the IoT device 104. Events can be associated with a specific context of an IoT device 104, such as having a specific operating system executing on an IoT device 104 or being controlled by a specific user.

In a specific implementation, the IoT device identification system 106 functions to determine events locally with respect to IoT devices 104. In determining events locally with respect to IoT devices 104, the IoT device identification system 106 can be implemented at a device within a LAN associated with or formed in part through the IoT device 104. Further, the IoT device identification system 106 can locally determine at a device within a LAN events for use in determining a grouping/labeling of an IoT device 104. For example, the IoT device identification system 106 can be implemented at a local agent and determine at the local agent events for use in grouping/labeling IoT devices 104.

In a specific implementation, the IoT device identification system 106 identifies event parameters (data or metadata) by analyzing the data packets. For example, if a data packet can be correlated with a specific application, then the IoT device identification system 106 can identify an event parameter of the specific application is executed in association with an IoT device 104. The IoT device identification system 106 can use packet header analysis to identify event parameters from data packets transmitted to or from an IoT device 104. Additionally, the IoT device identification system 106 can use deep packet inspection to identify event parameters from data packets. For example, the IoT device identification system 106 can use deep packet inspection to analyze a payload of a data packet sent from an IoT device 104 and subsequently identify an event parameter from the data packet.

In a specific implementation, the IoT device identification system 106 determines one or a combination of device sensor events, session events, application events, user events, protocol events, and status events included as part of a context of an IoT device in operation. Device sensor events can include events that occur at the physical layer of the physical layer or data link layer of the open system interconnection (hereinafter referred to as "OSI") model. For example, device sensor events can include a virtual LAN (hereinafter referred to as "VLAN") used by an IoT device to communicate with a specific data source. Session events can include events that occur at either the network layer or the transport layer of the OSI model. For example, session events can include a specific network type used by an IoT device to communicate with a source. Application events include events that occur at one or a combination of the session layer, the presentation layer, and the application layer of the OSI model. For example, application events can include an identification of an application executed at an IoT device in accessing network services. Device events can include events that occur at a specific device. User events can include events that occur in associated with a specific user interacting with an IoT device. For example, user events can include specific instances in which a specific user interacts with IoT devices. Status events can include events associated with whether an IoT device is operating. For example, status events can include an event indicating whether an IoT device is operating within a given operational efficiency range.

In a specific implementation, the IoT device identification system 106 functions to transform events into format suitable for grouping/labeling of IoT devices, by generating formatted events of IoT devices 104 in operation. A formatted event is a transformation of one or more timestamped events, including composite events. As used in this paper, a composite event comprises multiple event parameters, but is referred to as an "event," which is a more general term intended to represent a discrete event or a combination of event parameters (which can include one or more discrete events). For example, a discrete event, such as a signal transmitted from a thermometer associated with a discrete temperature sensing instance, can be combined with event parameters for the destination of the signal, historical signal transmissions, transmissions of similarly classified IoT devices, and the like, to generate a composite event. The context-aware IoT device identification system 106 can generate formatted events of IoT devices 104 in operation based on messages transmitted to or from IoT devices 104. For example, the context-aware IoT device identification system 106 can examine messages transmitted to an IoT device 104 to determine an event which can subsequently be timestamped to create a formatted event of the IoT device 104 in operation. The context-aware IoT device identification system 106 can generate formatted events of IoT devices in operation within a time window. For example, the context-aware IoT device identification system 106 can examine all messages transmitted from an IoT device 104 within a one hour period to determine a formatted event of the IoT device 104 in operation. A time window, also referred to as a data rollup window, used by the context-aware IoT device identification system 106 to generate formatted events of an IoT device 104 in operation. For example, the context-aware IoT device identification system 106 can examine packets transmitted from a first IoT device over a 24 hour period and examine packets transmitted from a second IoT device over a five minute period to extract features of the first and second IoT devices in operation. A time window used by the context-aware IoT device identification system 106 to extract features of IoT devices 104 in operation can vary based on contexts of the IoT devices 104. For example, the context-aware IoT device identification system 106 can vary time windows used to extract features of IoT devices 104 in operation based on communication manner of the IoT devices 104.

In a specific implementation, the context-aware IoT device identification system 106 functions to aggregate formatted events for purposes of determining grouping/labeling of IoT devices 104. The context-aware IoT device identification system 106 can aggregate formatted events based on context, such as by way of a profile-based aggregation. For example, the context-aware IoT device identification system 106 can aggregate formatted events based on recipients of data packets transmitted from an IoT device 104. In another example, the context-aware IoT device identification system 106 can aggregate formatted events based on an IoT device ID or a port used transmit data packets from which the formatted events are translated. Further, the context-aware IoT device identification system 106 can aggregate formatted events based on contexts associated with events. For example, the context-aware IoT device identification system 106 can aggregate formatted events based on whether the formatted events are one or a combination of device sensor events, session events, application events, user events, protocol events, and status events.

In a specific implementation, the context-aware IoT device identification system 106 can aggregate formatted events of IoT devices 104 in operation using common factor aggregation machine learning. For example, if, through machine learning, common factors of IoT devices that can be categorized in a certain group (e.g., thermostat) are identified, then the context-aware IoT device identification system 106 can group formatted events of IoT devices 104 based on the common factors identified through machine learning. The context-aware IoT device identification system 106 can use common factor aggregation machine learning to identify common factors of contexts of IoT devices 104 in operation, for use in aggregating formatted events based on context. For example, if formatted events related to operation of IoT devices by a particular user share a specific common factor, identified through machine learning, then the context-aware IoT device identification system 106 can group formatted events of the user operating IoT devices together based on the specific common factor. CFA can be used as an input, as well. The events aggregated based on context can be fed to a prediction engine to identify same type of IoT device or new type of IoT device.

In a specific implementation, the context-aware IoT device identification system 106 functions to drop specific determined features or formatted events from consideration in determining grouping/labeling of IoT devices 104. In dropping specific features from consideration in determining grouping/labeling of IoT devices 104, the context-aware IoT device identification system 106 can filter out irrelevant factors to only keep IoT compatible features for purposes of determining grouping/labeling of IoT devices 104. For example, the context-aware IoT device identification system 106 can filter out features associated with human factors in IoT device operation for purposes of determining grouping/labeling of IoT devices 104.

In a specific implementation, the context-aware IoT device identification system 106 functions to filter out features for use in determining grouping/labeling of IoT devices 104 based on either or both a personality of an IoT device and a profile of a certain set of IoT devices including the IoT device. A personality of an IoT device includes applicable data describing operation of an IoT device for purposes of determining grouping/labeling of the IoT devices 104. For example, a personality of an IoT device can include behavior patterns of an IoT device. A profile of a set of IoT devices includes application data describing operation of IoT devices in the set for purposes of determining grouping/labeling of the IoT devices in operation. For example, a profile of a set of IoT devices can include behavior patterns of the IoT devices in the set. IoT devices can be tentatively grouped together to form a profile, based on one or a combination of characteristics of the IoT devices, operational characteristics of the IoT devices, and contexts of the IoT devices in operation. For example, all IoT devices of a specific manufacturer of the same type can be tentatively grouped together to form a category (or profile). In filtering out features for use in determining grouping/labeling of the IoT devices based on either or both a personality of an IoT device and a profile of a group of IoT devices, the context-aware IoT device identification system 106 can filter out non-representative (e.g., abnormal) operating behaviors of the IoT device of the set of IoT devices using the personality of profile.

In a specific implementation, the context-aware IoT device identification system 106 functions to add aggregated events and features into an event buffer. An event buffer includes a collection of events and features that are held for a period of time and analyzed to determine grouping/labeling of IoT devices 104. An event buffer can be specific to a context associated with an IoT device in operation. For example, an event buffer can be associated with or specific to an application and can be used to determine grouping of IoT devices 104. In another example, an event buffer can be associated with IoT devices at a specific location and can be used to determine grouping/labeling of IoT devices 104. The context-aware IoT device identification system 106 can buffer aggregated events and features into event buffers based on contexts associated with aggregated events and features, e.g. contexts of an IoT device in operation. For example, the context-aware IoT device identification system 106 can buffer aggregated events and features into an event buffer based on whether the events are one or a combination of device sensor events, session events, application events, user events, protocol events, and status events.

In a specific implementation, the context-aware IoT device identification system 106 functions to determine grouping of IoT devices in operation through application of a context-based IoT device grouping model to events and features of an IoT device operating. A context-based IoT device grouping model includes applicable data describing parameters and weights thereof to perform grouping/labeling of IoT devices 104. Specifically, a context-based IoT device grouping model can include a modeled set of features indicating all or a portion of a behavior pattern corresponding to one or more labeled or non-labeled groups. For example, a context-based IoT device grouping model can include a combination of behavior events indicated by a single modeled feature to form a behavior pattern. A context-based IoT device grouping model is specific to a context of an IoT device. For example, a context-based IoT device grouping model can indicate characteristic behavior patterns of an IoT device in interacting with a specific remote system. In applying a context-based IoT device grouping model to determine grouping of IoT devices in operation, the context-aware IoT device identification system 106 can apply the model to compare current or past operating of an IoT device, e.g. indicated by aggregated events and features, with common or characteristic behavior patterns indicated by the model. Subsequently, by comparing the current or past operating of the IoT device with common or characteristic behavior patterns, the context-aware IoT device identification system 106 can determine grouping of IoT devices 104.

In a specific implementation, a context-based IoT device grouping model is included as part of a personality of an IoT device or a profile of a set of IoT devices. For example, a context-based IoT device grouping model can include common or characteristic behavior patterns of a type of IoT devices manufactured by the same manufacturer. In another example, a context-based IoT device grouping model can include common or characteristic behavior patterns of a specific IoT device when a streaming music application is executed on the IoT device. In another example, IoT devices can be grouped by type.

In a specific implementation, the context-aware IoT device identification system 106 functions to generate a context-based IoT device grouping model through a machine learning process with respect to aggregated events and features in event buffers. Depending upon implementation-specific or other considerations, the machine learning process employs one or more of machine learning algorithms, including but not limited to, tree ensemble based algorithm (e.g., Random Forest), a neural network based algorithm (e.g., feedforward neural network (FNN)), classification based algorithms (e.g., support vector machine (SVM), and boosting algorithms (e.g., eXtreme gradient boosting (XGB)). In a particular implementation, a boosting algorithm is preferably employed for the grouping of the IoT devices 104. A boosting algorithm has features that can handle abnormal distribution of data (which can be typical in parameters of a large number of IoT devices of various types), can handle high dimensional data represented by a large number of parameters, can ignore correlation of parameters by assigning a lower weight to correlated parameters, and can return a top relevant feature that can be used for grouping of the IoT devices. A neural network based algorithm may also have features that can handle abnormal distribution of data, can handle high dimensional data represented by a large number of parameters, and can ignore correlation of parameters by assigning a lower weight to correlated parameters.

In a specific implementation, the context-aware IoT device identification system 106 performs personality classification for IoT devices for the grouping/labeling through application of a plurality of context-based IoT device grouping models to events and features of IoT device operation. A behavior pattern of an IoT device can be represented by a plurality of context-based IoT device grouping models. Accordingly, the context-aware IoT device identification system 106 can apply the plurality of context-based IoT device grouping models to aggregated events and features of IoT devices 104 to determine IoT device personality. For example, if a first context-based IoT device grouping model indicates a first aspect of a behavior pattern of an IoT device and a second context-based IoT device grouping model indicates a second aspect of the behavior pattern of the IoT device, then the context-aware IoT device identification system 106 can apply both the first and second models to classify the IoT device as having a certain characteristic personality.

In a specific implementation, the context-aware IoT device identification system 106 functions to apply a context-based IoT device grouping model to aggregated events and features of an IoT device collected in event buffers in IoT device personality classification. Advantageously, aggregation based on known labels, remote IP, application, server port, or other factors can be on a granular level. For example, the context-aware IoT device identification system 106 can apply a context-based IoT device grouping model to aggregated events and features in a buffer, in an order of the events and features in the buffer. The context-aware IoT device identification system 106 can apply specific context-based IoT device grouping models to events and features based on a specific event buffer in which the events and features are collected. For example, if aggregated events are in an event buffer associated with applications executing on an IoT device, then the context-aware IoT device identification system 106 can apply context-based IoT device grouping models for IoT device personality classification when applications are executed at the IoT device. In another example, if aggregated events are in an event buffer associated with session events, then the context-aware IoT device identification system 106 can apply context-based IoT device grouping models for IoT device personality classification at a network layer level.

In a specific implementation, the context-aware IoT device identification system 106 functions to apply a context-based IoT device grouping model to aggregated events and features based on a context of an IoT device in operating to generate the events. For example, the context-aware IoT device identification system 106 can apply a context-based IoT device grouping model to aggregated events based on a port used in communicating data packets used to determine the events. In applying a context-based IoT device grouping model to aggregated events based on a context of an IoT device, the context-aware IoT device identification system 106 can apply a context-based IoT device grouping model based on an event buffer in which the events are buffered. For example, the context-aware IoT device identification system 106 can apply a context-based IoT device grouping model for analyzing device events to events buffered into an event buffer associated with events that occurred at a specific device layer.

In a specific implementation, the context-aware IoT device identification system 106 functions to carry out an assisted grouping/labeling based on offline external inputs, for example, from users or administrators. Depending upon implementation-specific or other considerations, the context-aware IoT device identification system 106 functions to carry out an assisted grouping/labeling, when grouping of an IoT device based on application of a context-based IoT device grouping model is unsuitable or unsuccessful (in error), e.g., when an IoT device cannot be categorized into any group of known IoT devices and/or when labeling of IoT devices, although can be categorized into a group, cannot be determined. Depending upon implementation-specific or other considerations, when grouping of an IoT device based on application of a context-based IoT device grouping model is unsuccessful (in error), the context-aware IoT device identification system 106 generates a request for grouping and/or labeling of IoT devices based on input by users, administrators, vendors, and/or expert knowledge. In a specific implementation, the context-aware IoT device identification system 106 allows for setting conditions to trigger error (or success) in the grouping/labeling of the IoT devices based on inputs from users, administrators, vendors, and/or expert knowledge.

In a specific implementation, the context-aware IoT device identification system 106 functions to carry out prediction of grouping/labeling of a new IoT device by applying one or more context-based IoT device grouping models to events or features of the new IoT device and generates a predicted grouping/labeling of the new IoT device. Depending upon implementation-specific or other considerations, with respect to one or more groups organized from pre-existing IoT devices, the context-aware IoT device identification system 106 determines probability that the new IoT device is categorized in the group, and determines a group with the highest probability as a group in which the new IoT device is categorize. Depending upon implementation-specific or other considerations, the context-aware IoT device identification system 106 determines the group for the new IoT device, on the condition that the highest probability is over a certain threshold. When the highest probability is lower than the certain threshold, the context-aware IoT device identification system 106 may determine that no group matches the new IoT device, i.e., grouping/labeling of the new IoT device into a group is unsuccessful (in error). Depending upon implementation-specific or other considerations, when the grouping/labeling of the new IoT device is unsuccessful, the context-aware IoT device identification system 106 may carry out the above-described assisted grouping/labeling. Alternatively, if by applying one model, no grouping is identified, the context-aware IoT device identification system 106 applies a second model, and potentially additional models after the second until all applicable models have been attempted, only then an error is generated which requires assisted grouping.

In a specific implementation, the context-aware IoT device identification system 106 functions to maintain context-based IoT device grouping models for use in determining grouping of IoT devices in operation. In maintaining a context-based IoT device grouping model for use in determining grouping of IoT devices in operation, the context-aware IoT device identification system 106 can create and update a context-based IoT device grouping model. For example, the context-aware IoT device identification system 106 can update a context-based IoT device grouping model as IoT devices continue to operate and/or as new IoT devices are added. The context-aware IoT device identification system 106 can maintain a context-based IoT device grouping model based on operation of IoT devices within a specific data window. For example, the context-aware IoT device identification system 106 can maintain a context-based IoT device grouping model offline daily based on IoT device operation during the day.

In a specific implementation, the context-aware IoT device identification system 106 functions to maintain a context-based IoT device grouping model based on events determined based on operation of one or a plurality of IoT devices. For example, the context-aware IoT device identification system 106 can maintain a context-based IoT device grouping model based on feature values of events occurring during operation of an IoT device. Additionally, the context-aware IoT device identification system 106 can maintain a context-based IoT device grouping model based on aggregated events occurring during operation of one or a plurality of IoT devices. For example, the context-aware IoT device identification system 106 can update a context-based IoT device grouping model based on feature values of events during operation of one or a plurality of IoT devices. Further in the example, the context-aware IoT device identification system 106 can maintain the context-based IoT device grouping model based on the feature values of the events aggregated together using common factor aggregation based on contexts of the one or a plurality of the IoT devices in operation.

In a specific implementation, the context-aware IoT device identification system 106 functions to determine behavior patterns of an IoT device in operation for use in maintaining a context-based IoT device grouping model. The context-aware IoT device identification system 106 can determine behavior patterns of an IoT device in operation based on aggregated events of the IoT device in operation. For example, if an IoT device exchanges data with a remote controller or destination every night, as indicated by aggregated events of the IoT device in operation, then the context-aware IoT device identification system 106 can determine a behavior pattern of the IoT device is exchanges data with the remote controller or destination at night. The context-aware IoT device identification system 106 can use an applicable machine learning mechanism to determine a behavior pattern of an IoT device in operation.

In a specific implementation, the context-aware IoT device identification system 106 functions to maintain a context-based IoT device grouping model based on contexts of one or a plurality of IoT devices in operation. Specifically, the context-aware IoT device identification system 106 can maintain a context-based IoT device grouping model based on a context of an IoT device in operating to generate aggregated events used to maintain the model. For example, if aggregated events of the IoT device in operation are created when a specific application is executing, then the context-aware IoT device identification system 106 can associate a context-based IoT device grouping model generated using the events with the specific application. Further in the example, the context-based IoT device grouping model can be applied by the context-aware IoT device identification system 106 to aggregated events generated when the specific application is executing at the IoT device to determine grouping of IoT devices in operation.

In a specific implementation, the context-aware IoT device identification system 106 functions to maintain a context-based IoT device grouping model as part of either or both a personality of an IoT device and a profile group of IoT devices. For example, the context-aware IoT device identification system 106 can maintain a context-based IoT device grouping model based on operation of an IoT device and subsequently include the context-based IoT device grouping model as part of a personality of the IoT device. In maintaining a context-based IoT device grouping model as part of a profile group of IoT devices, the context-aware IoT device identification system 106 can group together the IoT devices based on context of the IoT devices in operation. For example, the context-aware IoT device identification system 106 can group together IoT devices of a specific type, e.g. a context, into a profile group and subsequently add context-based IoT device grouping models generated based on operation of the IoT devices into the profile group of the IoT devices.

In an example of operation of the example system shown in FIG. 1, the IoT device identification system 106 identifies events of the IoT devices 104 in operation. In the example of operation of the example system shown in FIG. 1, the IoT device identification system 106 aggregates the events based on contexts of the IoT devices 104 in operation. Further, in the example of operation of the example system shown in FIG. 1, the IoT device identification system 106 buffers the aggregated events into an event buffer based on the contexts of the IoT devices 104 in operation.

In the example of operation of the example system shown in FIG. 1, the IoT device identification system 106 determine behaviors of an IoT device of the IoT devices 104 in operation based on the aggregated events in the event buffer. Additionally, in the example of operation of the example system shown in FIG. 1, the IoT device identification system 106 generates a context-based IoT device grouping model based on the aggregated events in the event buffer and the determined behaviors of the IoT devices. Further, in the example of operation of the example system shown in FIG. 1, the IoT device identification system 106 applies the context-based IoT device grouping model to the aggregated events and the determined behaviors of the IoT devices to determine grouping/labeling of the IoT devices. Moreover, in the example of operation of the example system shown in FIG. 1, the IoT device identification system 106 carries out assisted grouping/labeling of the IoT devices when the grouping/labeling based on the application of the context-based IoT device grouping model is unsuccessful. Furthermore, in the example of operation of the example system shown in FIG. 1, the IoT device identification system 106 applies the context-based IoT device grouping model to new IoT devices that have not been subjected to grouping/labeling to carry out grouping/labeling of the new IoT devices and optionally carries out assisted grouping/labeling with respect to the new IoT devices, if necessary. In the example of operation of the example system shown in FIG. 1, the IoT device identification system 106 maintains the context-based IoT device grouping model as pre-existing IoT devices operate and new IoT devices are added.

Figure 2:
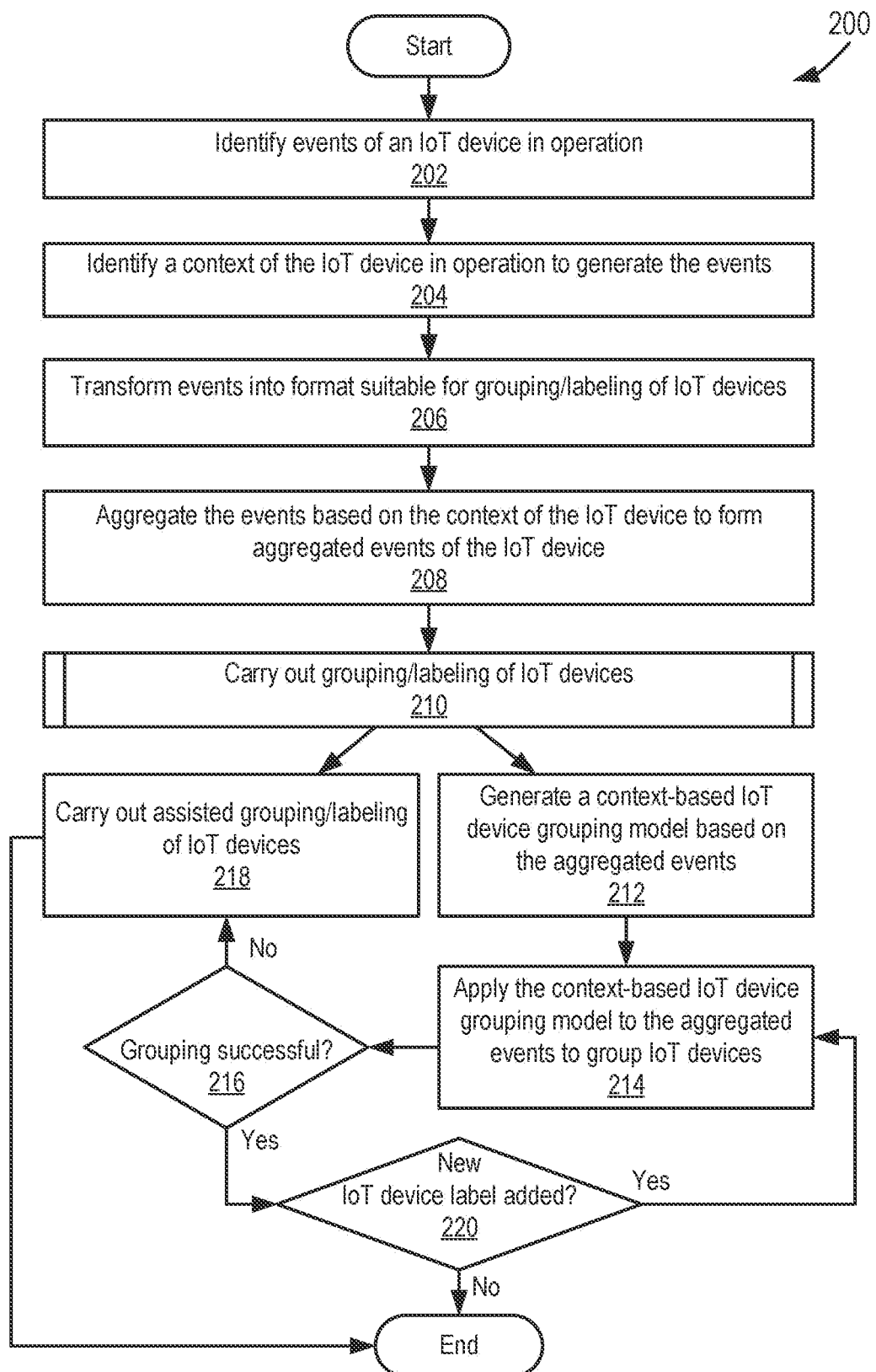
FIG. 2 depicts a flowchart of an example of a method for grouping/labeling IoT devices in operation.

FIG. 2 depicts a flowchart 200 of an example of a method for grouping/labeling IoT devices in operation. The flowchart 200 begins at module 202, where events of an IoT device in operation are identified. An applicable system for grouping IoT devices in operation based on context, such as the context aware IoT device identification systems described in this paper, can identify events of IoT devices in operation. Events of IoT devices in operation can be identified based on operation of IoT devices. For example, if an IoT device reports an increase in temperature in a room by five degrees, then events indicating the IoT device has indicated the temperature increased by five degrees can be identified. Additionally, events of an IoT device in operation can be identified based on messages transmitted to or from the IoT device. For example, an application executing at an IoT device can be determined by analyzing data packets transmitted to and from the IoT device during execution of the application at the IoT device.

The flowchart 200 continues to module 204, where a context of the IoT devices in operation to generate the events is identified. An applicable system for grouping IoT devices in operation based on context, such as the context aware IoT device identification systems described in this paper, can identify a context of the IoT device in operation to generate the events. For example, a communication protocol of the IoT device can be determined including a context of the IoT device. A context of the IoT device in operation can be identified based on a flow of data to and from the IoT device. For example, deep packet inspection can be performed on messages transmitted to and from the IoT device to identify a context of the IoT device in operation.

The flowchart 200 continues to module 206, where events of the IoT devices in operation are transformed into format suitable for grouping/labeling of IoT devices. An applicable system for transforming format of events, such as the context aware IoT device identification systems described in this paper, can transform the format of events into a suitable format for grouping/labeling of IoT devices.

The flowchart 200 continues to module 208, where the events are aggregated based on the context of the IoT device to form aggregated events of the IoT device. An applicable system for grouping IoT devices in operation based on context, such as the context aware IoT device identification systems described in this paper, can aggregate the events based on the context of the IoT device to form aggregated events. The events can be aggregated to form aggregated events according to an applicable machine learning method. Common factor aggregation is a way to apply various different machine learning and deep learning algorithms by focusing on common factors (like all devices of same profile, same OS, using Windows, using telnet, all devices talking to a specific subnet, to name several) as applied to both detected and modeled behavior. For example, session events can be aggregate together. In another example, streaming events can be aggregated together using time-window-based aggregation (e.g., within a limited range). The events can be aggregated locally with respect to the IoT device. For example, the events can be aggregated to form the aggregated events by a device implemented as part of a LAN with the IoT device.

The flowchart 200 continues to module 210, where grouping/labeling of the IoT devices is carried out. If grouping/labeling based on a context-based IoT device grouping model is suitable, e.g., when the data samples are sufficiently large (e.g., aggregated events greater than a threshold), the flowchart 200 proceeds to module 212, where a context-based IoT device grouping model is generated. An applicable system for generating a context-based IoT device grouping model based on context, such as the context aware IoT device identification systems described in this paper, can generate the context-based IoT device grouping model based on the context of the IoT devices.

The flowchart 200 continues to module 214, where a context-based IoT device grouping model is applied to the aggregated events according to the event buffer to determine grouping of the IoT devices in operation. An applicable system for grouping the IoT devices in operation based on context, such as the context aware IoT device identification systems described in this paper, can apply a context-based IoT device grouping model to the aggregated events according to the event buffer to determine grouping of the IoT devices in operation. For example, a behavior pattern of the IoT device can be determined from the aggregated events and the context-based IoT device grouping model can be applied to the determined behavior pattern to determine grouping of the IoT devices in operation. Further in the example, the determined behavior pattern of the IoT device can be compared to common or characteristic behavior patterns of the IoT devices in one or more groups based on the context-based IoT device grouping model, to determine grouping/labeling of the IoT devices. A context-based IoT device grouping model applied to determine grouping/labeling of the IoT devices in operation can be included as part of either or both a personality of the IoT device and a profile of a group of IoT devices associated with the IoT device. For example, a context-based IoT device grouping model can be included as part of a profile of a group of IoT devices including the IoT device that are all of the same device type.

The flowchart 200 continues to a decision block 216, where whether or not the grouping/labeling based on the context-based IoT device grouping model is successful is determined. An applicable system for grouping the IoT devices in operation based on context, such as the context aware IoT device identification systems described in this paper, can determine whether or not the grouping/labeling based on the context-based IoT device grouping model is successful. For example, when an IoT device cannot be categorized into any group of IoT devices and/or when labeling of IoT devices, although can be categorized into a group, cannot be determined, the grouping/labeling based on the context-based IoT device grouping model can be determined as unsuccessful.

If grouping/labeling based on a context-based IoT device grouping model is not suitable, e.g., when the data sample is too small (e.g., aggregated events smaller than a threshold) in the module 210, and if the grouping/labeling based on the context-based IoT device grouping model is determined to be unsuccessful in the decision block 216 (No in decision block 216), the flowchart 200 proceeds to module 218, where assisted grouping/labeling of the IoT devices is carried out. An applicable system for carrying out the assisted grouping/labeling of the IoT devices, such as the context aware IoT device identification systems described in this paper, can carry out the assisted grouping/labeling of the IoT devices based on the offline external inputs.

If the grouping/labeling based on the context-based IoT device grouping model is determined to be successful in the decision block 216 (Yes in decision block 216), the flowchart 200 proceeds to module 220, where whether or not a new IoT device is added is determined. An applicable system for determining whether a new IoT device is added, such as the context aware IoT device identification systems described in this paper, can determine whether or not a new IoT device is added. If a new IoT device is determined to be added (Yes in decision block 220), the flowchart 200 returns to the module 214, and if a new IoT device is not determined to be added (No in decision block 220), the flowchart 200 ends.

Figure 3:
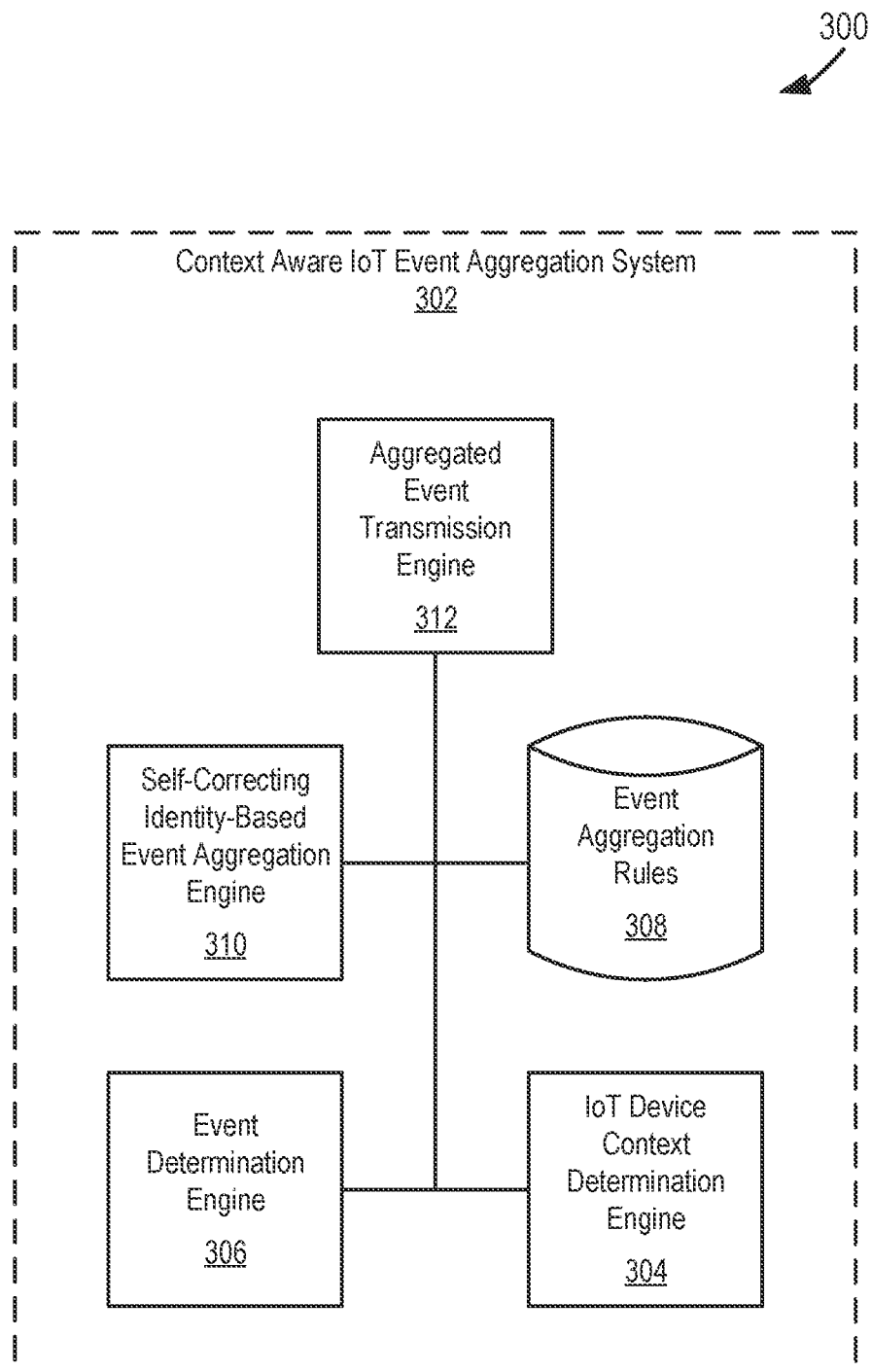
FIG. 3 depicts a diagram of an example context aware IoT event aggregation system.

FIG. 3 depicts a diagram 300 of an example context aware IoT event aggregation system 302. The context aware IoT event aggregation system 302 is intended to represent a system that functions to aggregate events of an IoT device in operation for purposes of grouping IoT devices in operation.

In a specific implementation, the context aware IoT event aggregation system 302 generates event parameters from data packets while refraining from storing the data packets. Specifically, the context aware IoT event aggregation system 302 can generate event metadata from data packets transmitted to and from an IoT device, without locally storing the actual data packets in non-volatile storage. The context aware IoT event aggregation system 302 can be included as part of an applicable system for identifying (or grouping) IoT devices in operation based on context, such as the context aware IoT device identification systems described in this paper. Additionally, the context aware IoT event aggregation system 302 can be implemented locally with respect to one or a plurality of IoT devices. For example, the context aware IoT event aggregation system 302 can be implemented as a local device forming part of a LAN at a home of a plurality of IoT devices. Further in the example, the context aware IoT event aggregation system 302 can be implemented at a local device configured to provide the IoT devices access to network services through the LAN.

In aggregating events for purposes of grouping/labeling IoT devices in operation, the context aware IoT event aggregation system 302 functions to determine events represented by event metadata for purposes of aggregating the events together. Further, the context aware IoT event aggregation system 302 can determine a context of an IoT device in operation for purposes of aggregating events together. For example, the context aware IoT event aggregation system 302 can determine a remote system an IoT device is communicating with and subsequently aggregate events associated with communications with the remote system for purposes of grouping/labeling IoT devices in operation. Additionally, the context aware IoT event aggregation system 302 can provide event metadata of aggregated events to a remote system for purposes of grouping/labeling IoT devices in operation at the remote system.

The example context aware IoT event aggregation system 302 shown in FIG. 3 includes an IoT context determination engine 304, an event determination engine 306, an event aggregation rules datastore 308, a self-correcting identity-based event aggregation engine 310, and an aggregated event transmission engine 312. In a specific implementation, the IoT context determination engine 304, the event determination engine 306, the event aggregation rules datastore 308, the self-correcting identity-based event aggregation engine 310, and the aggregated event transmission engine 312 are coupled with each other. The IoT device context determination engine 304 is intended to represent an engine that functions to determine a context of an IoT device in operation for purposes of grouping/labeling IoT devices in operation. The IoT device context determination engine 304 can determine a context of an IoT device in operation based on determined events in the operation of the IoT device. For example, the IoT device context determination engine 304 can determine that an IoT device is communicating with another IoT device in operation. In determining a context of an IoT device based on determined events in the operation of the IoT device, the IoT device context determination engine 304 can determine a context of an IoT device with respect to the events. For example, the IoT device context determination engine 304 can determine a context of an IoT device at a time when it was operating to cause specific events to occur at the IoT device. The IoT device context determination engine 304 can be based on input received from a user. For example, a user can register a device as a thermostat manufactured by a specific manufacturer.

The event determination engine 306 is intended to represent an engine that functions to determine events in operation of an IoT device for purposes of grouping/labeling IoT devices in operation. For example, the event determination engine 306 can determine that a specific user is operating or otherwise interacting with an IoT device for purposes of grouping/labeling IoT devices in operation. In determining events in operation of an IoT device, the event determination engine 306 can determine how the IoT device is actually operating. For example, the event determination engine 306 can determine that lights in an office shut themselves off at a specific time. In determining events in operation of an IoT device, the event determination engine 306 can generate event metadata indicating the determined events. For example, the event determination engine 306 can generate event metadata indicating streaming events occurring at an IoT device.

In a specific implementation, the event determination engine 306 functions to determine events in operation of an IoT device by analyzing messages transmitted either or both to and from the IoT device. The event determination engine 306 can use an applicable packet inspection mechanism to analyze messages transmitted to and from an IoT device for purposes of determining events in operation of the IoT device. Specifically, the event determination engine 306 can analyze data packet headers to determine events in operation of an IoT device. For example, the event determination engine 306 can analyze headers of data packets transmitted to and from an IoT device to determine another IoT device communicating with the IoT device. Additionally, the event determination engine 306 can perform deep packets inspection on data packets transmitted to and from an IoT device to determine events in operation of the IoT device. For example, the event determination engine 306 can perform deep packet inspection to determine session events of an IoT device in operation. Further, in a specific implementation, the event determination engine 306 functions to transform events into format suitable for grouping/labeling of IoT devices, by generating formatted events of IoT devices 104 in operation.

The event aggregation rules datastore 308 is intended to represent a datastore that functions to store event aggregation rules data. Event aggregation rules data stored in the event aggregation rules datastore 308 includes data identifying applicable rules for aggregating events in the operation of IoT devices for use in grouping IoT devices in operation. Event aggregation rules can be specific to contexts of IoT devices. For example, event aggregation rules can specify to aggregate streaming events occurring in the operation of an IoT device together. Further, event aggregation rules can specify common factors to use in aggregating events together. For example, event aggregation rules can specify to aggregate events of an IoT device communicating with a specific remote system, as indicated by a common factor. Event aggregation rules can be specific to a context of an IoT device in operation. For example, event aggregation rules can specify to aggregate all streaming events occurring at an IoT device together.

In a specific implementation, event aggregation rules indicated by event aggregation rules data stored in the event aggregation rules datastore 308 changes over time. Specifically, event aggregation rules can change over time based on observed behaviors of an IoT device in operation. For example, if an IoT device continues to operate according to specific process protocols, then event aggregation rules can specify aggregating events associated with IoT devices operating according to the specific process protocols. Additionally, event aggregation rules can change over time based on successful grouping/labeling of IoT devices in operation. For example, if streaming events aggregated together lead to better results in predicting groups of IoT devices in operation, as determined through machine learning, then event aggregation rules can specify aggregating streaming events together. Further, event aggregation rules can be created and modified based on user input. For example, a user can specify to aggregate network layer events together for a specific type of IoT device, and event aggregation rules can subsequently be created and modified to indicate aggregating network layer events together for the specific type of IoT device.

The self-correcting identity-based event aggregation engine 310 is intended to represent an engine that functions to aggregate events together for purposes of grouping/labeling IoT devices in operation. In aggregating events together, the self-correcting identity-based event aggregation engine 310 can aggregate event metadata for aggregated events. For example, the self-correcting identity-based event aggregation engine 310 can aggregate event metadata of IoT device events occurring in the operation of an IoT device. The self-correcting identity-based event aggregation engine 310 can aggregate events using common factor aggregation. Specifically, the self-correcting identity-based event aggregation engine 310 can identify common factors amongst events and subsequently aggregate the events together based on shared common factors. For example, the self-correcting identity-based event aggregation engine 310 can identify common factors amongst device sensor events and subsequently group together the device sensor events based on the shared common factors. Self-correction is possible because the event aggregation automatically adapts to match the environment. Identity-based is possible because all of the various events are associated with an IoT device identity.

In a specific implementation, the self-correcting identity-based event aggregation engine 310 functions to aggregate events based on contexts of an IoT device in operation. More specifically, the self-correcting identity-based event aggregation engine 310 can aggregated events based on contexts of an IoT device associated with the events. For example, if a specific device was controlling operation of an IoT device when an IoT device was operating to cause the occurrence of specific events, then the self-correcting identity-based event aggregation engine 310 can aggregate the specific events together based on the fact they occurred when the specific device was operating the IoT device. In another example, if specific events occurred when an IoT device was communicating with a specific remote system, then the self-correcting identity-based event aggregation engine 310 can aggregate the specific events together based on the fact they occurred when the IoT device was communicating with the specific remote system.

In a specific implementation, the self-correcting identity-based event aggregation engine 310 can aggregate events according to event aggregation rules. For example, if event aggregation rules specify aggregating all session events of an IoT device in operation, then the self-correcting identity-based event aggregation engine 310 can aggregate all session events of the IoT device. In another example, if event aggregation rules specify aggregating events based on one or a combination of a device ID, application, and an IP address, then the self-correcting identity-based event aggregation engine 310 can aggregate events based on one or a combination of the device ID, the port number, and the IP address.

In a specific implementation, the self-correcting identity-based event aggregation engine 310 functions to aggregate events within a time window, otherwise referred to as a data rollup window. For example, the self-correcting identity-based event aggregation engine 310 can aggregate events over a 24 hour time period. In another example, the self-correcting identity-based event aggregation engine 310 can aggregate events over a week long time period. In aggregating events over a longer time period, e.g. a day or a week, grouping/labeling of IoT devices that are normally inactive can still be performed. A data rollup window in which the self-correcting identity-based event aggregation engine 310 aggregates events can vary. For example, a data rollup window can vary on a per-device, per-application, and a per-device type basis. Additionally, a data rollup window in which the self-correcting identity-based event aggregation engine 310 aggregated events can vary based on a context of an IoT device in operation. For example, a data rollup window in which the self-correcting identity-based event aggregation engine 310 aggregated events can decrease in size as an IoT device becomes more active.

In a specific implementation, the self-correcting identity-based event aggregation engine 310 aggregates events within a short data rollup window. A short data rollup window is a time window between one and five minutes. In aggregating events over a short data rollup window, the self-correcting identity-based event aggregation engine 310 can aggregate events from port scans that occur every minute. Further, in aggregating events over a short data rollup window, heartbeats can be observed as they persistently appear in the events aggregated by the self-correcting identity-based event aggregation engine 310 in the short data rollup window. Devices that communicate with a remote controller daily or persistent DDOS attacks can be observed as they persistently appear in the events aggregated by the self-correcting identity-based event aggregation engine 310 in a long data rollup window.

In a specific implementation, the self-correcting identity-based event aggregation engine 310 functions to filter out events for purposes of grouping/labeling IoT devices in operation. In filtering out events for purposes of grouping/labeling IoT devices in operation, the self-correcting identity-based event aggregation engine 310 can filter out irrelevant features to grouping/labeling IoT devices in operation. For example, the self-correcting identity-based event aggregation engine 310 can filter out features associated with human factors in IoT device operation for purposes of grouping/labeling IoT devices in operation. As another example, the self-correcting identity-based event aggregation engine 310 can filter out features that would cause model instability (e.g., features that give mixed signals or random noise).

The aggregated event transmission engine 312 is intended to represent an engine that functions to transmit aggregated events to a remote system for purposes of grouping/labeling IoT devices in operation. The aggregated event transmission engine 312 can transmit event metadata of aggregated events to a remote system for purposes of grouping/labeling IoT devices in operation. For example, the aggregated event transmission engine 312 can transmit event metadata of aggregated session events occurring at an IoT device for purposes of grouping/labeling IoT devices in operation. The aggregated event transmission engine 312 can transmit aggregated events to a remotely implemented portion of an applicable system for grouping/labeling IoT devices in operation based on context, such as the context aware IoT device identification systems described in this paper. The aggregated event transmission engine 312 can transmit aggregated events to a remote system implemented in the cloud.

In an example of operation of the example context aware IoT event aggregation system 302 shown in FIG. 3, the IoT device context determination engine 304 determines a context of an IoT device in operation. In the example of operation of the example system shown in FIG. 3, the event determination engine 306 determines events occurring at the IoT device during the operation of the IoT device. Further, in the example system shown in FIG. 3, the event aggregation rules datastore 308 stores event aggregation rules data indicating event aggregation rules for controlling aggregation of events occurring at an IoT device. In the example system shown in FIG. 3, the self-correcting identity-based event aggregation engine 310 aggregates the events determined by the event determination engine 306 according to the event aggregation rules based on the context of the IoT device in operation, as determined by the IoT device context determination engine 304. Additionally, in the example of operation of the example system shown in FIG. 3, the aggregated event transmission engine 312 transmits event metadata of the aggregated events to a remote system for use in grouping/labeling IoT devices in operation.

Figure 4:
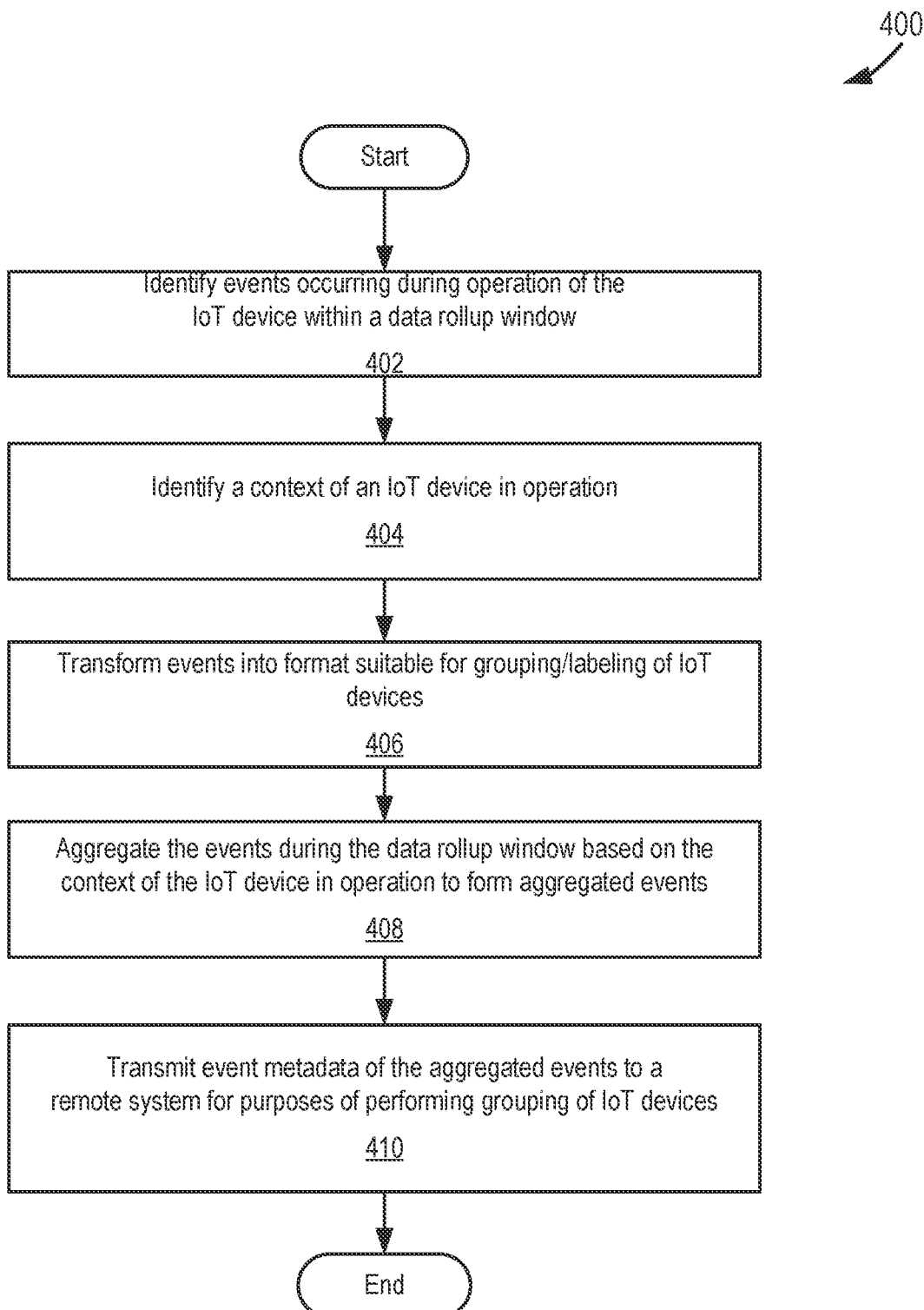
FIG. 4 depicts a flowchart of an example of a method for aggregating events occurring at IoT devices based on context for purposes of grouping/labeling IoT devices in operation.

FIG. 4 depicts a flowchart 400 of an example of a method for aggregating events occurring at IoT devices based on context for purposes of grouping/labeling IoT devices in operation. The flowchart 400 begins at module 402, where events occurring during operation of the IoT device within a data rollup window are determined. An applicable engine for identifying events occurring during operation of an IoT device, such as the event determination engines described in this paper, can identify events occurring during operation of the IoT device within a data rollup window. Events occurring during operation of the IoT device can be identified using applicable mechanism. For example, data packets transmitted to and from the IoT device during operation of the IoT device can be analyzed to identify events occurring during operation of the IoT device. In identifying events occurring during operation of the IoT device, event metadata can be created indicating the identified events.

The flowchart 400 continues to module 404, where a context of IoT devices in operation is identified. An applicable engine for identifying a context of IoT devices in operation, such as the IoT device context determination engines described in this paper, can determine a context of IoT devices in operation. A context of an IoT device can be determined based on identified events occurring at the IoT device during operation. For example, an identification of an IoT device can be determined from data packets transmitted to and from the IoT device. Additionally, a context of an IoT device can be determined based on input received from a user. For example, a user can register a device as a thermostat or CT scanner manufactured by a specific manufacturer.

The flowchart 400 continues to module 406, where events of the IoT devices in operation are transformed into format suitable for grouping/labeling of IoT devices. An applicable system for transforming format of events, such as the event determination engines described in this paper, can transform the format of events into a suitable format for grouping/labeling of IoT devices.

The flowchart 400 continues to module 408, where the events are aggregated within the data rollup window based on the context of the IoT device in operation to form aggregated events. An applicable engine for aggregating events based on context, such as the context aware event aggregation engines described in this paper, can aggregate the events within the data rollup window based on the context of the IoT device to form aggregated events. For example, session events occurring at the IoT device can be aggregated together based on the context of the IoT device. In aggregating events, event metadata of the events can be grouped together to indicate the aggregated events.

The flowchart 400 continues to module 410, where event metadata of the aggregated events is transmitted to a remote system for purposes of grouping/labeling IoT devices. An applicable engine for transmitting event metadata of aggregated events, such as the aggregated event transmission engines described in this paper, can transmit event metadata of the aggregated events to a remote system for purposes of grouping IoT devices in operation. For example, event metadata of the aggregated events can be transmitted to a remote portion of an applicable system for grouping/labeling IoT devices in operation based on context, such as the context aware IoT device identification systems described in this paper.

Figure 5:
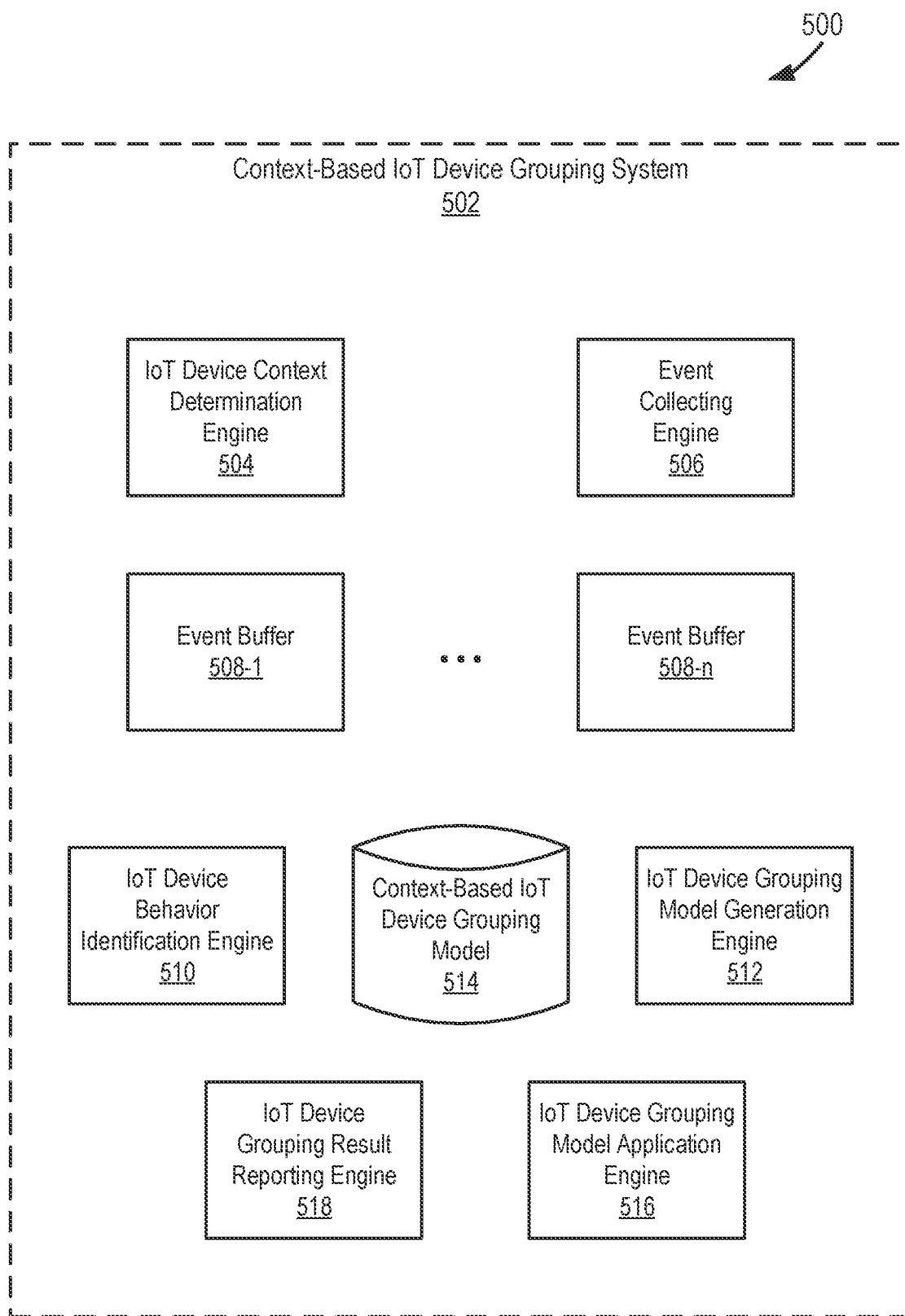
FIG. 5 depicts a diagram of an example context-based IoT device grouping system.

FIG. 5 depicts a diagram 500 of an example context-based IoT device grouping system 502. The context-based IoT device grouping system 502 is intended to represent a system that functions to perform grouping of IoT devices in operation based on a context of the IoT devices in operation. The context-based IoT device grouping system 502 can be included as part of an applicable system for identifying IoT devices in operation based on context, such as the context aware IoT device identification systems described in this paper. Additionally, the context-based IoT device grouping system 502 can be implemented remote from an IoT device. For example, the context-based IoT device grouping system 502 can be implemented in the cloud remote from an IoT device for which the context-based IoT device grouping system 502 performs grouping/labeling of IoT devices in operation.

The context-based IoT device grouping system 502 functions to receive event metadata of aggregated events occurring during operation of an IoT device for purposes of grouping/labeling IoT devices in operation. For example, the context-based IoT device grouping system 502 can receive event metadata of aggregated protocol events of an IoT device in operation from an applicable system for aggregating events such as the context aware IoT device aggregation systems described in this paper. Additionally, the context-based IoT device grouping system 502 can collect aggregated events into event buffers based on a context of an IoT device in operation. For example, the context-based IoT device grouping system 502 can collect event data of aggregated events including device sensor events into an event buffer specific to processing device sensor events. Further, the context-based IoT device grouping system 502 can apply a context-based IoT device grouping model to events in an event buffer for purposes of grouping IoT devices in operation. For example, the context-based IoT device grouping system 502 can determine a current behavior pattern of an IoT device from aggregated events in an event buffer. Further in the example, the context-based IoT device grouping system 502 can compare current behaviors to a common or characteristic behavior pattern of one or more groups formed based on application of the context-based undesired behavior detection model.

The example context-based IoT device grouping system 502 shown in FIG. 5 includes an IoT device context determination engine 504, an event collecting engine 506, event buffer 508-1 to event buffer 508-n (hereinafter referred to as "event buffers 508"), an IoT device behavior identification engine 510, an IoT device grouping model generation engine 512, a context-based IoT device grouping model datastore 514, an IoT device grouping model application engine 516, and an IoT device grouping/labeling result reporting engine 518. In a specific implementation, the IoT device context determination engine 504, the event collecting engine 506, the event buffers 508, the IoT device behavior identification engine 510, the IoT device grouping model generation engine 512, the context-based IoT device grouping model datastore 514, the IoT device grouping model application engine 516, and the IoT device grouping result reporting engine 518 are interconnected with each other.

The IoT device context determination engine 504 is intended to represent an engine that functions to determine contexts of an IoT device, such as the IoT device context determination engines described in this paper. The IoT device context determination engine 504 can determine a context of an IoT device based on events occurring in the operation of the IoT device. For example, if an IoT device is experiencing a number of streaming events, then the IoT device context determination engine 504 can determine a streaming application is executing at the IoT device. Additionally, the IoT device context determination engine 504 can determine a context of an IoT device based on received user input. For example, a technician can register a medical device as an X-ray scanner manufactured by a specific manufacturer and the IoT device context determination engine 504 can determine the context of the device is an X-ray scanner manufactured by the specific manufacturer.

The event collecting engine 506 is intended to represent an engine that functions to collect aggregated events into event buffers 508 for purposes of grouping IoT devices in operation. In collecting aggregated events into event buffers 508, the event collecting engine 506 can add event metadata of the aggregated events into a specific event buffer 508. For example, the event collecting engine 506 can collect aggregated protocol events of an IoT device into an event buffer 508 by adding event metadata indicating the aggregated protocol events into the event buffer 508. In collecting aggregated events, the event collecting engine 506 can receive event metadata of aggregated events.

In a specific implementation, the event collecting engine 506 functions to collect aggregated events into an event buffer based on a context of an IoT device when the aggregated events occurred. For example, if a thermostat can measure and report the temperature in a room, then the event collecting engine 506 can collect events of a heater in operation to raise the temperature into an event buffer specific to devices measuring and/or controlling temperature. Further, the event collecting engine 506 can collect aggregated events into an event buffer based on whether the events are one or a combination of device sensor events, session events, application events, user events, protocol events, and status events. For example, if aggregated events are application events, then the event collecting engine 506 can collect the aggregated events into an event buffer specific to processing application events for purposes of grouping/labeling IoT devices in operation. Aggregation can be accomplished via time rollup window aggregation, time factor aggregation, or the like.

The event buffers 508 are intended to represent buffers used in processing events for purposes of grouping/labeling IoT devices in operation. The event buffers 508 can each be specific to a different context of an IoT device. For example, a first event buffer can be specific to IoT devices of a specific type. Additionally, the event buffers 508 can be specific to one or a combination of device sensor events, session events, application events, user events, protocol events, and status events. For example, a first event buffer can be used in processing streaming events while a second event buffer can be used in processing application events for purposes of grouping IoT devices in operation. The event buffers 508 can be configured to form a pipeline of event buffers. For example, a first event buffer can be logically positioned above a second event buffer to cause aggregated events to pass from the first event buffer to the second event buffer after the events are processed in the first event buffer.

In a specific implementation, the event buffers 508 function to receive event metadata for events aggregated together. The event buffers 508 can collect event metadata of aggregated events for purposes of analyzing the events to determine grouping/labeling of IoT devices in operation. For example, the event buffers 508 can collect received event metadata of aggregated events in an order that the event metadata is received for purposes of analyzing the events to perform grouping/labeling of IoT devices in operation.

The IoT device behavior identification engine 510 is intended to represent an engine that functions to determine behaviors of an IoT device in operation to determine grouping of IoT devices in operation. The IoT device behavior identification engine 510 can determine behaviors of an IoT device through neural network-based learning. For example, the IoT device behavior identification engine 510 can identify DNS names that appear random from a volume DNS query through neural network-based learning. Additionally, the IoT device behavior identification engine 510 can determine behaviors of an IoT device using state transition learning. For example, the IoT device behavior identification engine 510 can identify behaviors of an IoT device in operation from states of an IoT device for events and transitions between events in the operation of the IoT device.

Furthermore, the IoT device behavior identification engine 510 can identify behaviors based on network parameters. For example, the IoT device behavior identification engine 510 identifies behavior of an IoT device as "call home" behavior when the IoT device has called to its manufacturer to report status thereof. In another example, the IoT device behavior identification engine 510 identifies behavior of an IoT device based on frequency of data communication (e.g., frequency at which a telemetry IoT device sends measurement signals, such as heart beats). In another example, the IoT device behavior identification engine 510 identifies behavior of an IoT device based on a size of data communicated by the IoT device. In another example, the IoT device behavior identification engine 510 identifies behavior of an IoT device based on network protocol and remote port number used by the IoT device, packet header specific to a certain network protocol and a port number used by the IoT device, bytes count of data (e.g., packets) sent or received by the IoT device, ratio between byte count of sent data to byte count of received data, frequency at which similar sized packets are sent to remote server, average latency between packets and the corresponding variance, identification of servers contacted by the IoT device and connection time, network traffic associated with time of day or day of the week regarding the IoT device, and periodic network activity that is automatically identified and correlated to application behavior, to name a few.

In a specific implementation, the IoT device behavior identification engine 510 functions to determine behaviors of an IoT device based on events occurring in the operation of the IoT device and collected in event buffers 508. More specifically, the IoT device behavior identification engine 510 can determine events in operation of an IoT device by analyzing event metadata of aggregated events in event buffers 508. For example, the IoT device behavior identification engine 510 can determine an IoT device communicated with a specific source based on event metadata of aggregated events in an event buffer 508. In another example, the IoT device behavior identification engine 510 can determine an IoT device had a streaming application executing on it by analyzing event metadata of aggregated events occurring at the IoT device and collected into event buffers 508. The IoT device behavior identification engine 510 can identify behaviors of an IoT device in operation by analyzing aggregated events in an order that the events are collected in an event buffer 508.

The IoT device grouping model application engine 512 is intended to represent an engine that functions to generate a context-based IoT device grouping model based on the aggregated events stored in the event buffer 508 and/or behavior determined by the IoT device behavior identification engine 510. The IoT device grouping model application engine 512 generates context-based IoT device grouping model by employing a machine learning scheme with respect to the aggregated events and/or the determined behavior. The machine learning scheme may be based on one or more of algorithms, including but not limited to, tree ensemble based algorithm, a neural network based algorithm, classification based algorithms, and boosting algorithms. In a specific implementation, the IoT device grouping model application engine 512 may sequentially employ two or more algorithms to generate a context-based IoT device grouping model. In another specific implementation, the IoT device grouping model application engine 512 may generate two or more context-based IoT device grouping model employing different machine learning algorithm and/or different combination of machine learning algorithms. The IoT device grouping model application engine 512 stores context-based IoT device grouping model data indicating context-based IoT device grouping models in the context-based IoT device grouping model datastore 514.

The context-based IoT device grouping model datastore 514 is intended to represent a datastore that functions to store context-based IoT device grouping model data indicating context-based IoT device grouping models for use in performing grouping of IoT devices in operation. Context-based IoT device grouping model data stored in the context-based IoT device grouping model datastore 514 can indicate either or both characteristic and common behavior patterns of an IoT device in one or more groups. For example, context-based IoT device grouping model data stored in the context-based IoT device grouping model datastore 514 can indicate remote systems an IoT device communicates with as part of its regular behavior pattern for purposes of grouping IoT devices in the behavior of the IoT device.

In a specific implementation, the context-based IoT device grouping model datastore 514 functions to store context-based IoT device grouping models maintained in a common language. Specifically, a context-based IoT device grouping model stored in the context-based IoT device grouping model datastore 514 can be built in one language, e.g. Python, and then translated into a common language. For example, a context-based IoT device grouping model stored in the context-based IoT device grouping model datastore 514 can include descriptions of characteristic or common behavior of IoT devices in a group, written in a common language such as java script object notation (hereinafter referred to "JSON"). A context-based IoT device grouping model stored in the context-based IoT device grouping model datastore 514 can be written offline based on events occurring in historical data and then imported into the context-based IoT device grouping model datastore 514 for use in grouping IoT devices in operation.

In a specific implementation, a context-based IoT device grouping model stored in the context-based IoT device grouping model datastore 514 includes personality description labels for grouping IoT devices capable of being detected through application of a model. Specifically, a context-based IoT device grouping model stored in the context-based IoT device grouping model datastore 514 can include personality description labels for use in grouping IoT devices in operation. A personality description label can include applicable data for grouping IoT devices in operation. A personality description label can include common behavior of an IoT device categorized in a group or specific deviations in behavior from characteristic and what is causing the IoT device to operate according to the deviations in behavior from the characteristic or common behavior of a group. For the avoidance of doubt, in a specific implementation, a personality description is not just about deviation; it describes normal behavior, as well. Machine learning approach, protocol, usage pattern, ID, manufacturer, MAC address, etc. can be used to classify and label devices.

The IoT device grouping model application engine 516 is intended to represent an engine that functions to perform grouping of IoT devices in operation based on a context of the IoT device. The IoT device grouping model application engine 516 can determine grouping of an IoT device by applying a context-based IoT device grouping model to determined behaviors of the IoT device and/or aggregated events in the event buffer 508. For example, the IoT device grouping model application engine 516 can apply a context-based IoT device grouping model to determine difference from a characteristic or common behavior pattern of IoT devices in one or more groups based on the context-based IoT device grouping model. The IoT device grouping model application engine 516 can apply a context-based IoT device grouping model to behaviors exhibited by an IoT device as determined from aggregated events collected in an event buffer 508. For example, the IoT device grouping model application engine 516 can apply a context-based IoT device grouping model to streaming behaviors of an IoT device as determined from aggregated streaming events to determine grouping/labeling of the IoT device.

In a specific implementation, the IoT device grouping model application engine 518 functions to select a context-based IoT device grouping model to apply for purposes of grouping/labeling IoT devices. The IoT device grouping model application engine 518 can determine a context-based IoT device grouping model to apply based on an event buffer 508 in which aggregated events are collected. For example, if behaviors are determined from aggregated events in a specific event buffer 508, then the IoT device grouping model application engine 518 can select a specific context-based IoT device grouping model associated with the specific event buffer 508. Further, the IoT device grouping model application engine 518 can select a context-based IoT device grouping model to apply based on either or both a context of an IoT device and contexts of associated IoT devices. For example, if an IoT device is manufactured by a specific manufacturer, then the IoT device grouping model application engine 518 can select a context-based IoT device grouping model created by modeling behavior of devices manufactured by the specific manufacturer. Additionally, the IoT device grouping model application engine 518 can select a context-based IoT device grouping model based on whether behaviors are determined from events that are one or a combination of device sensor events, session events, application events, user events, protocol events, and status events. For example, if the IoT device grouping model application engine 518 is applying a model to behaviors of an IoT device determined from session events, then the IoT device grouping model application engine 518 can select a context-based IoT device grouping model created from session events occurring at an IoT device.

In a specific implementation, the IoT device grouping model application engine 518 functions to label one or more groups of IoT devices that is organized based on application of a context-based IoT device grouping model. The IoT device grouping model application engine 518 can label one or more groups of IoT devices according to personality description labels included as part of a context-based IoT device grouping model. For example, the IoT device grouping model application engine 518 can label a group of IoT devices as being characteristic of a thermostat using personality description labels included as part of a context-based IoT device grouping model.

The IoT device grouping result reporting engine 518 is intended to represent an engine that functions to report grouping/labeling result of an IoT device. The IoT device grouping result reporting engine 518 can generate and send a grouping/labeling result report including applicable data related to grouping of IoT devices in operation. Specifically, the IoT device grouping result reporting engine 518 can generate and send a grouping/labeling result report including identifiers of groups organized as a result of the application of a context-based IoT device grouping model, identifiers of IoT devices included in one or more labeled groups, labeling of one or more labeled groups, identifiers of non-labeled groups, if any, and identifiers of IoT devices that are not grouped, if any. For example, the IoT device grouping result reporting engine 518 can generate and send a grouping/labeling result report indicating grouping/labeling of IoT devices in operation.

In a specific implementation, the IoT device grouping result reporting engine 518 functions to generate and send a grouping/labeling result report including a prediction accuracy degree to which an IoT device is categorized in a group, with respect to one or more of IoT devices. For example, if an IoT device is deviating slightly from a characteristic or common behavior of typical IoT devices in the group, then the IoT device grouping result reporting engine 516 can included a lower prediction accuracy degree in the grouping/labeling report.

In an example of operation of the example context-based IoT device grouping system 502 shown in FIG. 5, the IoT device context determination engine 504 determines a context of an IoT device in operation. In the example of operation of the example system shown in FIG. 5, the event collecting engine 506 receives aggregated events occurring in the operation of the IoT device. Further, in the example of operation of the example system shown in FIG. 5, the event collecting engine 506 collects the aggregated events in one of the event buffers 508 based on the determined context of the IoT device. In the example of operation of the example system shown in FIG. 5, the IoT device behavior identification engine 510 determines behaviors of the IoT device in operation based on the aggregated events in the event buffer 508. In the example of operation of the example system shown in FIG. 5, the IoT device grouping model generation engine generates a context-based IoT device grouping model based on the aggregated events stored in the event buffer 508 and/or behavior determined by the IoT device behavior identification engine 510. Additionally, in the example of operation of the example system shown in FIG. 5, the IoT device grouping model application engine 516 performs grouping of IoT devices in operation by applying the context-based IoT device grouping model to the behaviors determined by the IoT device behavior identification engine 510. In the example of operation of the example system shown in FIG. 5, the IoT device grouping result reporting engine 518 generates and sends a grouping/labeling result report based on grouping of the IoT devices in operation performed by the IoT device grouping model application engine 516.

Figure 6:
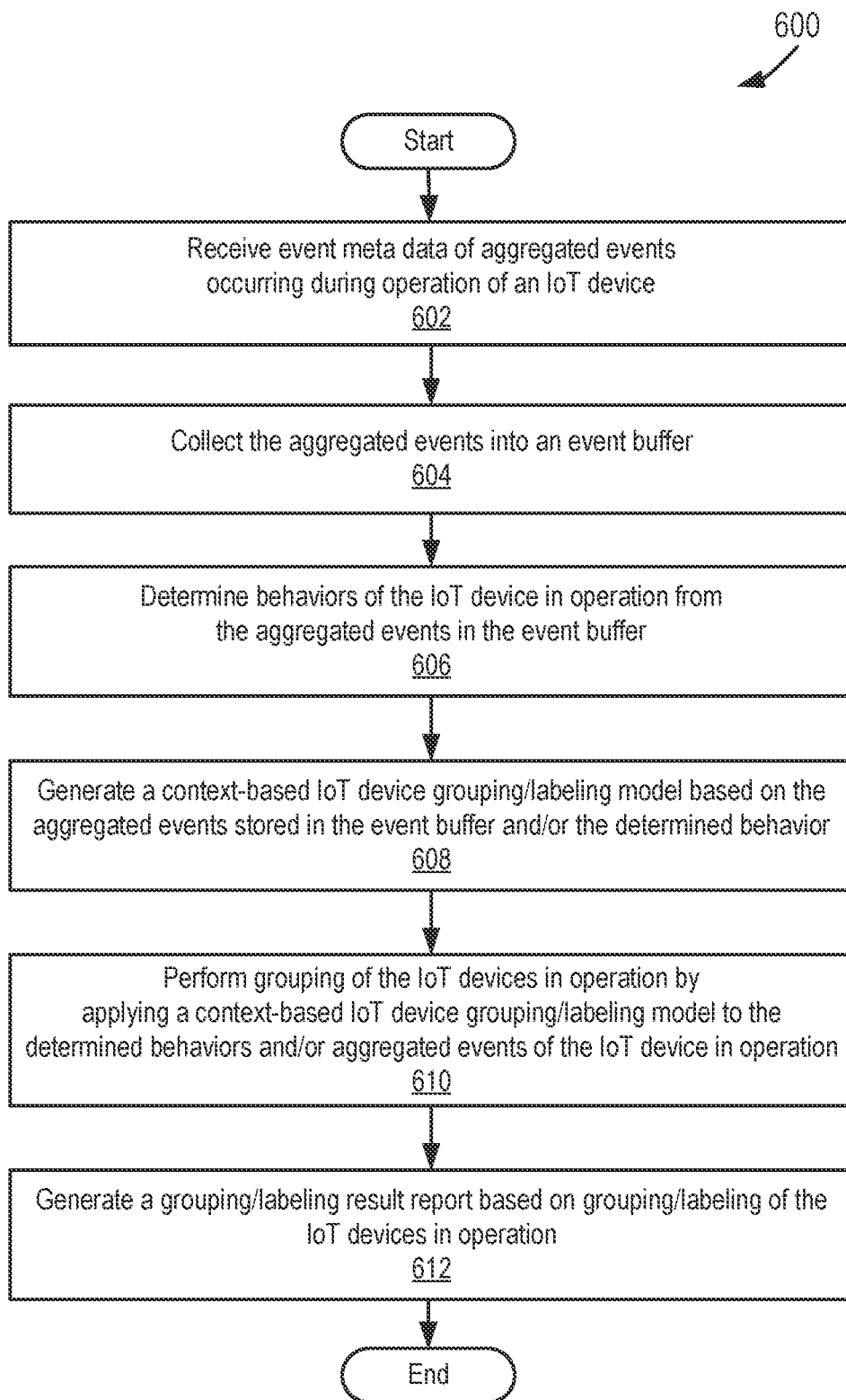
FIG. 6 depicts a flowchart of an example of a method for performing grouping/labeling of IoT devices in operation using aggregated events occurring in the operation of the IoT device.

FIG. 6 depicts a flowchart 600 of an example of a method for performing grouping/labeling of IoT devices in operation using aggregated events occurring in the operation of the IoT device. The flowchart 600 begins at module 602, where event metadata of aggregated events occurring during operation of an IoT device is received. An applicable engine for receiving event metadata of aggregated events, such as the event collecting engines described in this paper, can receive event metadata of aggregated events. Event metadata of aggregated events can be received from an applicable system for aggregating events based on a context of an IoT device, such as the context aware IoT event aggregation systems described in this paper.

The flowchart 600 continues to module 604, where the aggregated events are collected into an event buffer. An applicable engine for collecting events occurring during operation of an IoT device, such as the event collecting engines described in this paper, can collect the aggregated events into an event buffer. The aggregated events can be collected into an event buffer based on a context of the IoT device. For example, the aggregated events can be collected into an event buffer associated with a specific user operating the device when the aggregated events occurred. Additionally, the aggregated events can be collected into an event buffer based on whether the events are one or a combination of device sensor events, session events, application events, user events, protocol events, and status events.

The flowchart 600 continues to module 606, where behaviors of the IoT device in operation are determined from the aggregated events in the event buffer. An applicable engine for determining behaviors of an IoT device, such as the IoT device behavior identification engines described in this paper can determine behaviors of the IoT device in operation from the aggregated events in the event buffer. For example, states of an IoT device in operation corresponding to behaviors of the IoT device in operation can be determined from either or both the events themselves or transitions between the events.

The flowchart 600 continues to module 608, where a context-based IoT device grouping and labeling model is generated based on the aggregated events stored in the event buffer and/or the determined behavior. An applicable engine for generating a context-based IoT device grouping and labeling model, such as the IoT device grouping and labeling model generation engines described in this paper, can generate a context-based IoT device grouping and labeling model. In a specific implementation, the context-based IoT device grouping and labeling model is generated by employing a machine learning scheme, i.e., one or more of tree ensemble based algorithm, a neural network based algorithm, classification based algorithms, and boosting algorithms, with respect to the aggregated events and/or the determined behavior.

The flowchart 600 continues to module 610, where grouping of the IoT devices are performed by applying a context-based IoT device grouping and labeling model to the determined behaviors and/or aggregated events of the IoT devices in operation. An applicable engine for applying a context-based IoT device grouping and labeling model, such as the IoT device grouping and labeling model application engines described in this paper, can apply a context-based IoT device grouping and labeling model to the determined behaviors and/or aggregated events of the IoT devices to perform grouping and labeling of the IoT devices. A context-based IoT device grouping and labeling model can be selected based on a context of the IoT device. Further, a context-based IoT device grouping and labeling model can be selected based on whether the aggregated events are one or a combination of device sensor events, session events, application events, user events, protocol events, and status events.

The flowchart 600 continues to module 612, where a grouping and labeling result report is generated based on grouping of IoT devices in operation. An applicable engine for generating and sending a grouping and labeling result report based on grouping of the IoT devices in operation, such as the IoT device grouping and labeling result reporting engines described in this paper, can generate a grouping and labeling result report based on grouping and labeling of the IoT devices in operation. A grouping and labeling result report can include a description of how the IoT devices are operating to cause the grouping and labeling of the IoT devices in operation. Additionally, a grouping and labeling result report can include labels of one or more groups organized based on the application of the context-based IoT device grouping and labeling model.

Figure 7:
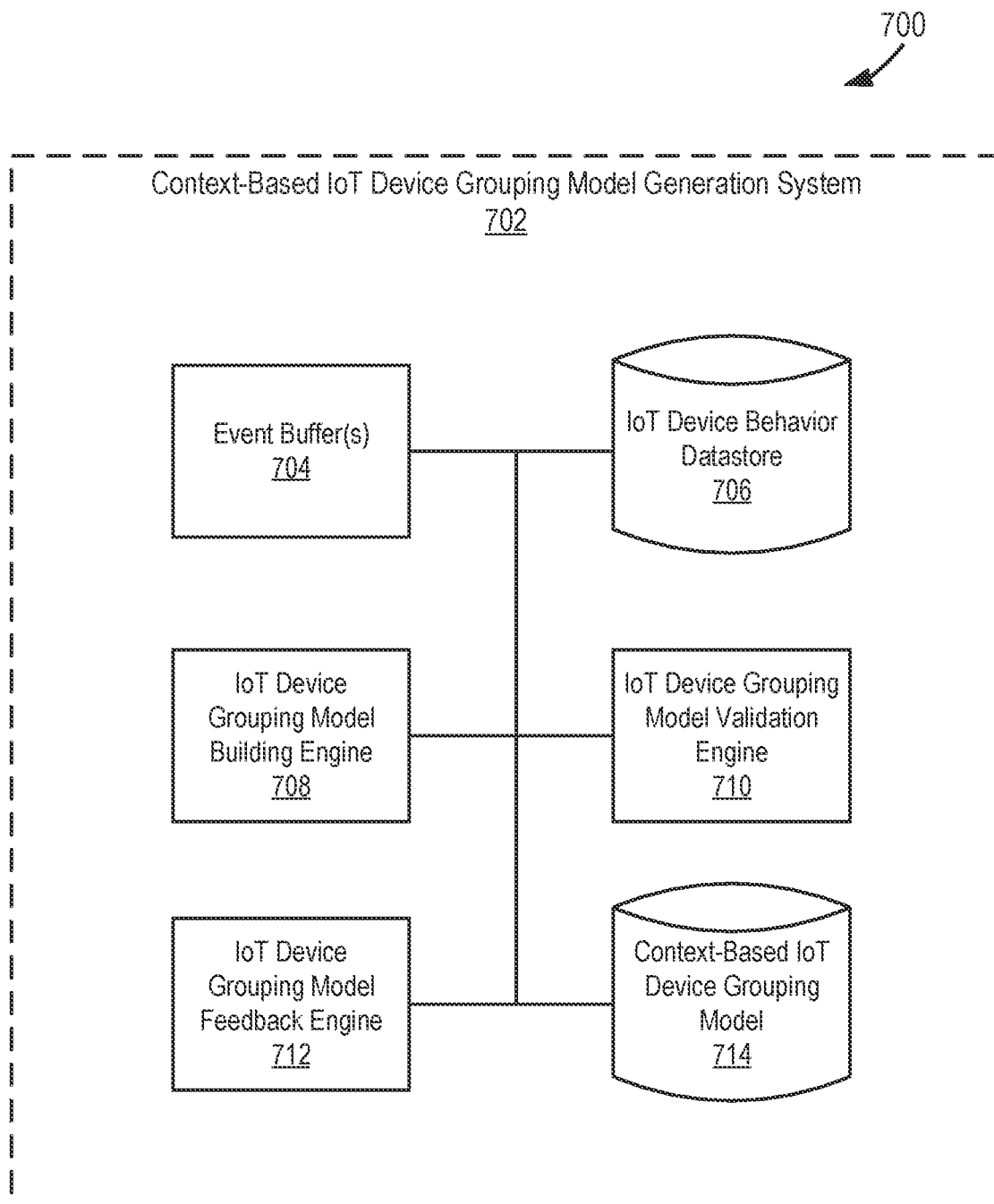
FIG. 7 depicts a diagram of an example context-based IoT device grouping model generation system.

FIG. 7 depicts a diagram 700 of an example context-based IoT device grouping model generation system 702. The context-based IoT device grouping model generation system 702 is intended to represent a system that functions to generate a context-based IoT device grouping model based on aggregated events and behaviors of IoT devices in operation. The context-based IoT device grouping model generation system 702 can be included as part of an applicable system for grouping IoT devices in operation, such as the context-based IoT device grouping systems described in this paper. Additionally, the context-based IoT device grouping model generation system 702 can be implemented remote from an IoT device. For example, the context-based IoT device grouping model generation system 702 can be implemented in the cloud remote from an IoT device for which the context-based IoT device grouping model generation system 702 generates a context-based IoT device grouping model.

The example context-based IoT device grouping model generation system 702 shown in FIG. 7 includes event buffer(s) 704, an IoT device behavior datastore 706, an IoT device grouping model building engine 708, an IoT device grouping model validation engine 710, an IoT device grouping model feedback engine 712, and a context-based IoT device grouping model datastore 714. In a specific implementation, the event buffer(s) 704, the IoT device behavior datastore 706, the IoT device grouping model building engine 708, the IoT device grouping model validation engine 710, the IoT device grouping model feedback engine 712, and the context-based IoT device grouping model datastore 714 are interconnected with each other.

The event buffers 704 are intended to represent buffers used in processing events for building a context-based IoT device grouping model. The event buffers 704 can employ the same or similar structure as the event buffers 508 depicted in FIG. 5.

The IoT device behavior datastore 706 is intended to represent a datastore including behaviors of IoT devices in operation to build a context-based IoT device grouping model. The behaviors of IoT devices are determined based on the context of the IoT devices and aggregated events of the IoT devices by an applicable engine, such as the IoT device behavior identification engines described in this paper.

The IoT device grouping model building engine 708 is intended to represent an engine that functions to build a context-based IoT device grouping model based on the aggregated events of IoT devices and behaviors of the IoT devices, by employing a machine learning process. Depending upon implementation-specific or other considerations, the machine learning process includes one or more of machine learning algorithms, including but not limited to, tree ensemble based algorithm (e.g., Random Forest), a neural network based algorithm (e.g., FNN), classification based algorithms (e.g., SVM), and boosting algorithms (e.g., XGB). In a particular implementation, a boosting algorithm is preferably employed for the grouping of the IoT devices. In another particular implementation, a plurality of machine learning algorithms is employed in a sequential manner. For example, a context-based IoT device grouping model obtained through one machine learning algorithm is further utilized by another (or the same) machine learning algorithm to generate a modified context-based IoT device grouping model. In another particular implementation, a plurality of machine learning algorithms is employed in a parallel manner. For example, a context-based IoT device grouping model obtained through each of a plurality of machine learning algorithm is combined at a particular weight to generate a combined context-based IoT device grouping model.

In a specific implementation, the IoT device grouping model building engine 708 functions to split the aggregated events and the determined behaviors of IoT devices into training data sets and testing data sets. The training data sets are used for building the context-based IoT device grouping model, and the testing data sets are used for validating the built context-based IoT device grouping model. For example, the IoT device grouping model building engine 708 randomly categorizes aggregated events and behaviors of a first part of the entire IoT devices in operation as training data sets and categorizes aggregated events and behaviors of a second part of the entire IoT devices in operation as testing data sets. Depending upon implementation-specific or other considerations, a ratio of the training data sets with respect to the testing data sets is 4/1 to 20/1, with a 10/1 yielding good results for relatively large sets; however the ratio of the training data sets with respect to the testing data sets is not limited thereto. Further, depending upon implementation-specific or other considerations, the IoT device grouping model building engine 708 requests offline inputs of actual grouping/labeling of IoT devices that are categorized into the testing data sets, by sending inquiries to users, administrators, vendors, and so on. The IoT device grouping model building engine 708 can also use unsupervised machine learning to build models, but unsupervised machine learning provides groups, not labels.

In a specific implementation, the IoT device grouping model building engine 708 functions to select parameters of the IoT devices to be used for building the context-based IoT device grouping model, using the aggregated events and the behaviors of the IoT devices categorized into the training data sets, in accordance with a certain machine learning algorithm. For example, the IoT device grouping model building engine 708 functions to increase or decrease, by a predetermined amount, weight of one or more parameters, which corresponds to one of the aggregated events and the behaviors, based on previously-set weight of parameter and a validation result of a previously-build context-based IoT device grouping model. Further, in a specific implementation, the IoT device grouping model building engine 708 functions to build a context-based IoT device grouping model based on the selected parameters of the training data sets.

The IoT device grouping model validation engine 710 is intended to represent an engine that functions to validate a context-based IoT device grouping model that has been built by the IoT device grouping model building engine 708, using the aggregated events and the behaviors of IoT devices categorized into testing data sets by the IoT device grouping model building engine 708. In a specific implementation, the IoT device grouping model validation engine 710 determines, with respect to each of one or more IoT devices categorized into the testing data sets, whether or not a grouping/labeling result of the IoT devices included in the testing data sets by applying the built context-based IoT device grouping model matches actual grouping/labeling of the IoT devices included in the testing data sets.

The IoT device grouping model feedback engine 712 is intended to represent an engine that functions to carry out error handling with respect a validation result obtained from the IoT device group model validation engine 710. In carrying out the error handling, the IoT device grouping model feedback engine 712 determines a degree of deviation between the model-based grouping/labeling of the IoT devices included in the testing data sets and the actual grouping/labeling of the IoT devices included in the testing data sets, and feeds back the degree of deviation to the IoT device grouping model building engine 708, such that the IoT device grouping model building engine 708 can build a more accurate context-based IoT device grouping model based on the feedback.

The context-based IoT device grouping model datastore 714 is intended to represent a datastore that functions to store context-based IoT device grouping model data indicating context-based IoT device grouping models that have been validated by the IoT device grouping model validation engine 710. The context-based IoT device grouping model datastore 714 can employ the same or similar structure as the context-based IoT device grouping model datastore 514 depicted in FIG. 5.

In an example of operation of the example context-based IoT device grouping model generation system 702 shown in FIG. 7, the IoT device grouping model building engine 708 splits the aggregated events and the determined behaviors of IoT devices into training data sets and testing data sets. Also, in the example of operation of the example system shown in FIG. 7, the IoT device grouping model building engine 708 selects parameters of the IoT devices to be used for building the context-based IoT device grouping model, using the aggregated events and the behaviors of the IoT devices categorized into the training data sets. Further, in the example of operation of the example system shown in FIG. 7, the IoT device grouping model building engine 708 builds a context-based IoT device grouping model based on the selected parameters of the training data sets. In the example of operation of the example system shown in FIG. 7, the IoT device grouping model validation engine 710 validates the context-based IoT device grouping model that has been built by the IoT device grouping model building engine 708, using the aggregated events and the behaviors of IoT devices categorized into testing data sets. In the example of operation of the example system shown in FIG. 7, the IoT device grouping model feedback engine 712 carries out error handling with respect a validation result obtained from the IoT device group model validation engine 710. In the example of operation of the example system shown in FIG. 7, a context-based IoT device grouping model that has been validated by the IoT device group model validation engine 710 is stored in the context-based IoT device grouping model datastore 714.

Figure 8:
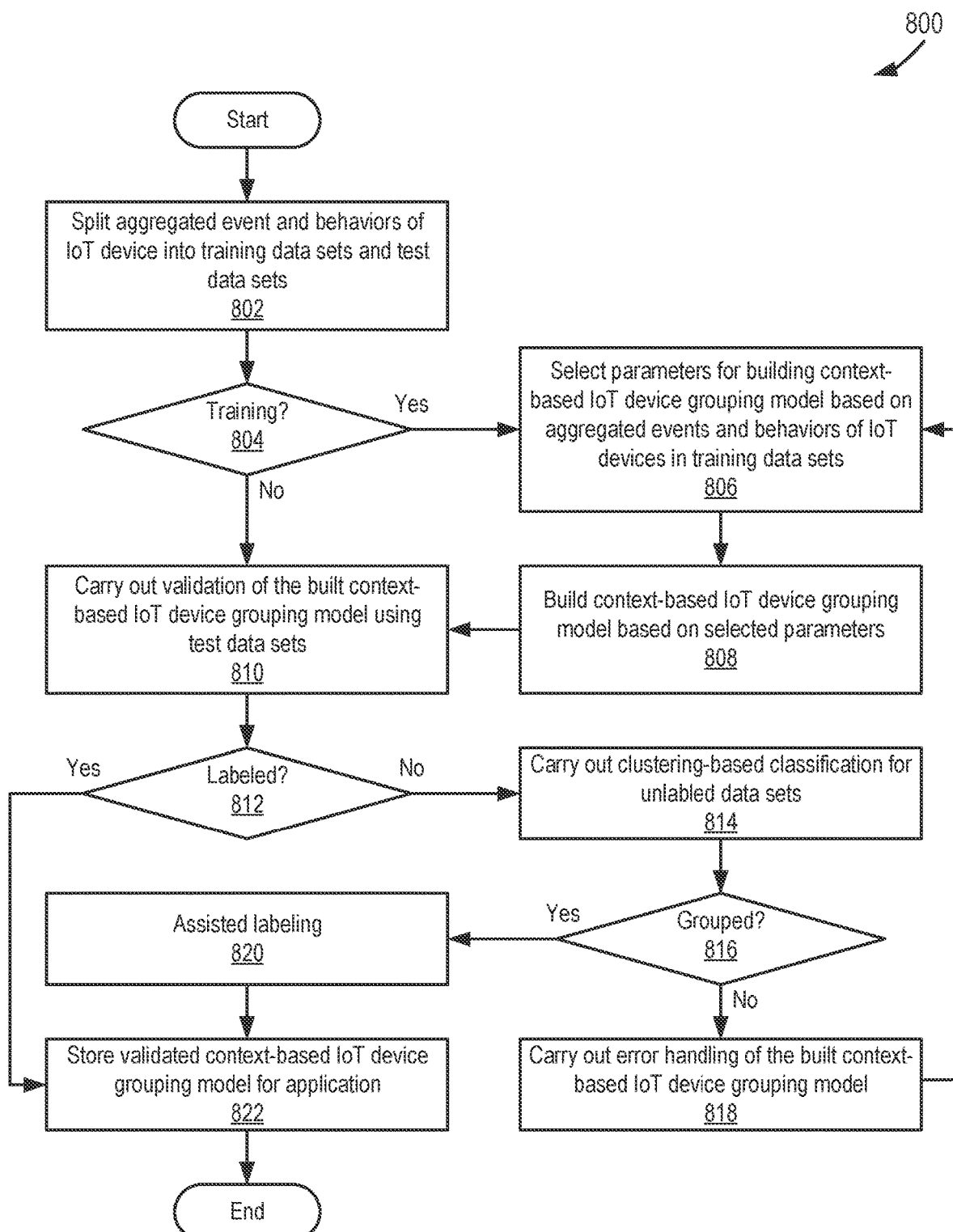
FIG. 8 depicts a flowchart of an example of a method for generating a context based IoT device grouping model.

FIG. 8 depicts a flowchart 800 of an example of a method for generating a context based IoT device grouping model. The flowchart 800 begins at module 802, where aggregated events and behaviors of IoT devices are split into training data sets and testing data sets. An applicable engine for splitting the aggregated events and behaviors of IoT devices into training data sets and testing data sets, such as the IoT device grouping model building engines described in this paper, can split the aggregated events and behaviors of IoT devices into training data sets and testing data sets. The aggregated events can be received from an applicable engine for aggregating events based on a context of an IoT device, such as the event collecting engines described in this paper. The behaviors of IoT can be received from an applicable engine for determining behaviors of IoT devices, such as the IoT device behavior identification engines described in this paper.

The flowchart 800 continues to decision block 804, where whether aggregated events and behaviors of an IoT device is for an IoT device categorized into training data sets or for an IoT device categorized into testing data sets is determined. When the aggregated events and behaviors of an IoT device is for an IoT device categorized into testing data sets (No in decision block 804), the flowchart 800 continues to module 810. When the aggregated events and behaviors of an IoT device is for an IoT device categorized into training data sets (Yes in decision block 804), the flowchart 800 continues to module 806, where parameters of the IoT devices to be used for building the context-based IoT device grouping model are selected, using the aggregated events and the behaviors of the IoT devices categorized into the training data sets, in accordance with a certain machine learning algorithm. An applicable engine for selecting parameters for a context-based IoT device grouping model, such as the IoT device grouping model building engines described in this paper, can select parameters for a context-based IoT device grouping model.

The flowchart 800 continues to module 808, where a context-based IoT device grouping model is built based on the selected parameters of the training data sets. An applicable engine for building a context-based IoT device grouping model, such as the IoT device grouping model building engines described in this paper, can build a context-based IoT device grouping model.

The flowchart 800 continues to module 810, where validation of a context-based IoT device grouping model that has been built based on the selected parameters, using the aggregated events and the behaviors of IoT devices categorized into testing data sets is carried out. An applicable engine for performing validation of a context-based IoT device grouping model, such as the IoT device grouping model validation engines described in this paper, can perform validation of a context-based IoT device grouping model.

The flowchart 800 continues to decision point 812, where whether the data set is labeled. When the data set is unlabeled (decision point 812, No), the flowchart 800 continues to module 814, where clustering-based classification for unlabeled data sets is carried out, and to decision point 816 where it is determined whether the data set is grouped. When the data set is ungrouped (decision point 816, No) the flowchart continues to module 818 where error handling of the built context-based IoT device grouping model is carried out. In performing the error handling, a degree of deviation between the model-based grouping/labeling of the IoT devices included in the testing data sets and the actual grouping/labeling of the IoT devices included in the testing data sets is determined, and the determined degree of deviation is fed back for selection of parameters carried out in module 806, which was described previously. An applicable engine for performing error handling of a built context-based IoT device grouping model, such as the IoT device grouping model feedback engines described in this paper, can perform error handling of a built context-based IoT device grouping model. as described previously. When, on the other hand, the data set is grouped (decision point 816, Yes), the flowchart 800 continues to module 820 where assisted labeling is conducted.

When the data set is labeled (decision point 812, Yes), the flowchart 800 ends at module 822, where the validated context-based IoT device grouping model is stored in a datastore for application to IoT device of which grouping/labeling has been not performed. The flowchart 800 also ends at module 822 following assisted labeling (module 820).

Figure 9:
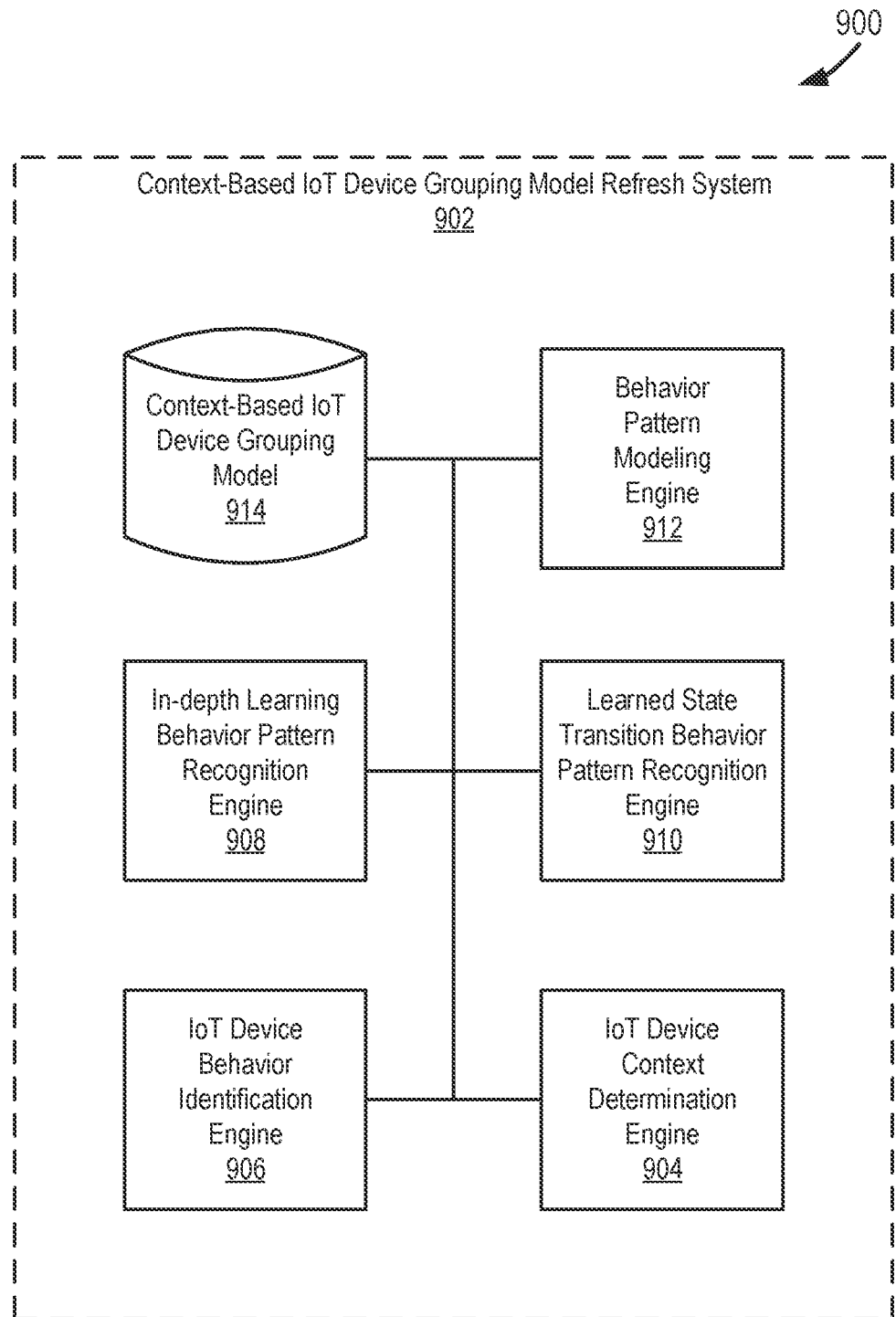
FIG. 9 depicts a diagram of an example context-based IoT device grouping model maintenance system.

FIG. 9 depicts a diagram 900 of an example context-based IoT device grouping model maintenance system 902. The context-based IoT device grouping model maintenance system 902 is intended to represent a system that maintains context-based IoT device grouping models for purposes of grouping/labeling IoT devices in operation. The context-based IoT device grouping model maintenance system 902 can be included as part of an applicable system for grouping/labeling IoT devices in operation based on context, such as the context-based IoT device grouping system described in this paper. Additionally, the context-based IoT device grouping model maintenance system 902 can be implemented remote from an IoT device. For example, the context-based IoT device grouping model maintenance system 902 can be implemented in the cloud remote from an IoT device whose behavior is monitored to perform grouping of the IoT devices in operation.

The context-based IoT device grouping model maintenance system 902 functions to generate and update context-based IoT device grouping models based on behaviors and/or aggregated events of IoT devices. In maintaining context-based IoT device grouping models based on behaviors and/or aggregated events, the context-based IoT device grouping model maintenance system 902 can determine behaviors of IoT devices in operation. For example, the context-based IoT device grouping model maintenance system 902 can determine behaviors of IoT devices in operation based on aggregated events occurring during operation of the IoT devices. Additionally, the context-based IoT device grouping model maintenance system 902 can recognize behavior patterns from determined behaviors of IoT devices in maintaining a context-based IoT device grouping model. For example the context-based IoT device grouping model maintenance system 902 can recognize characteristic or common behavior patterns of IoT devices in one or more groups and build or update a context-based IoT device grouping model based on the recognized characteristic or common behavior patterns of the IoT devices in one or more groups.

In a specific implementation, the context-based IoT device grouping model maintenance system 902 functions to maintain context-based IoT device grouping models offline. In maintaining context-based IoT device grouping models offline, the context-based IoT device grouping model maintenance system 902 can maintain the models at specific times regardless of current operation of IoT devices. For example, the context-based IoT device grouping model maintenance system 902 can update context-based IoT device grouping models every day. Further a context-based IoT device grouping model maintained by the context-based IoT device grouping model maintenance system 902 can be shared between different users. For example, if a first user's IoT device is used to create a context-based IoT device grouping model, then the context-based IoT device grouping model maintenance system 902 can share the model with another user unrelated to the first user.

In a specific implementation, the context-based IoT device grouping model maintenance system 902 functions to maintain a context-based IoT device grouping model included as part of either or both a personality of an IoT device and a profile of a group of IoT devices. For example, the context-based IoT device grouping model maintenance system 902 can maintain a context-based IoT device grouping model for instances when an IoT device is streaming data, included as part of a personality of the IoT device, based on streaming events occurring during operation of the IoT device. In another example, the context-based IoT device grouping model maintenance system 902 can maintain a context-based IoT device grouping model, included as part of a profile of a group of IoT devices that are grouped together based on a shared context, for session events occurring during operation of the IoT devices.

The example context-based IoT device grouping model maintenance system 902 shown in FIG. 9 includes an IoT device context determination engine 904, an IoT device behavior identification engine 906, a deep learning behavior pattern recognition engine 908, a learned state transition behavior pattern recognition engine 910, a behavior pattern modeling engine 912, and a context-based IoT device grouping model datastore 914. In a specific implementation, the IoT device context determination engine 904, the IoT device behavior identification engine 906, the deep learning behavior pattern recognition engine 908, the learned state transition behavior pattern recognition engine 910, the behavior pattern modeling engine 912, and the context-based IoT device grouping model datastore 914 are coupled with each other.

The IoT device context determination engine 904 is intended to represent an engine that functions to determine a context of an IoT device, such as the IoT device context determination engines described in this paper. The IoT device context determination engine 904 can determine a context of an IoT device based on events occurring in the operation of the IoT device. For example, if an IoT device is communicating with a web server, then the IoT device context determination engine 904 can determine that a web browser is executing at the IoT device. Additionally, the IoT device context determination engine 904 can determine a context of an IoT device based on received user input. For example, a user can specify a type of data communicable by an IoT device and the IoT device context determination engine 904 can determine the type of communication made by an IoT device based on a user input.

The IoT device behavior identification engine 906 is intended to represent an engine that functions to identify behaviors of an IoT device in operation, such as the IoT device behavior identification engines described in this paper. The IoT device behavior identification engine 906 can determine behaviors of an IoT device based on events occurring in the operation of the IoT device and collected in event buffers. More specifically, the IoT device behavior identification engine 906 can determine events in operation of an IoT device by analyzing event metadata of aggregated events in event buffers. For example, the IoT device behavior identification engine 906 can determine an IoT device received data used in executing a specific application from a remote source based on event metadata of aggregated events in an event buffer. In another example, the IoT device behavior identification engine 906 can determine an IoT device had a streaming application executing on it by analyzing event metadata of aggregated events occurring at the IoT device and collected into event buffers.

The in-depth learning behavior pattern recognition engine 908 is intended to represent an engine that functions to recognize behavior patterns of IoT devices in operation. In-depth learning includes supervised classification, unsupervised clustering, and deep learning. The in-depth learning behavior pattern recognition engine 908 can recognize behavior patterns of IoT devices by applying deep learning to identified behaviors of an IoT device. For example, if an IoT device in executing a streaming application receives data at a specific frequency, then the in-depth learning behavior pattern recognition engine 908 can use deep learning to associate the behavior of data being received at a specific frequency with the behavior pattern of the streaming application executing at the IoT device. The in-depth learning behavior pattern recognition engine 908 can use either or both deep learning or unsupervised clustering to recognize behavior patterns of IoT devices in operation. For example, in-depth learning can be used to tell a difference between one model of X-ray machine and another due to the ability to detect minor differences between usage patterns and label correctly.

In a specific implementation, using in-depth learning to recognize behavior patterns of IoT devices, the in-depth learning behavior pattern recognition engine 908 functions to generate a multi-layer neural network graph derived from classified behavior patterns using neural network-based learning. More specifically, the in-depth learning behavior pattern recognition engine 908 can generate a multi-layer neural network graph of behavior patterns of an IoT device.

In a specific implementation, the deep learning behavior pattern recognition engine 908 can use deep learning to identify recognized behavior patterns of IoT devices in operation as either or both characteristic or common behavior patterns of IoT devices in a specific group. For example, the deep learning behavior pattern recognition engine 908 can identify a recognized behavior pattern as a characteristic behavior pattern, e.g. it regularly occurs at an IoT device in a group. In another example, the deep learning behavior pattern recognition engine 908 can identify a recognized behavior pattern as a common behavior pattern.

The learned state transition pattern recognition engine 910 is intended to represent an engine that functions to recognize behavior patterns of IoT devices in operation using learned state transition-based learning. The learned state transition pattern recognition engine 910 can recognize behavior patterns of IoT device in operation using learned state transition-based learning according to identified behaviors occurring during operation of an IoT device. More specifically, the learned state transition pattern recognition engine 910 can apply learned state transition-based learning to events occurring during operation of an IoT device. For example, the learned state transition pattern recognition engine 910 can define sets of states of an IoT device corresponding to events and transitions between events occurring in the operation of the IoT device. Further in the example, the learned state transition pattern recognition engine 910 can define a state of an IoT device in operation as being categorized in a specific group when specific events occur at the IoT device. A state defined by the learned state transition pattern recognition engine 910 can include variances in events and transitions that when met still indicate an IoT device is at the state.

In a specific implementation, the learned state transition pattern recognition engine 910 functions to maintain a state transition graph. A state transition graph can include connected states defined for an IoT device in operation through state transition-based learning. For example, a state transition graph can connect a first state of a port scan being done to a second state of a DNS query being performed within an hour of the port scan, which is indicative of a state indicative of a specific group of IoT devices. Further in the example, a state transition graph can connect the first state of the port scan occurring to the second state of the DNS query being performed to the state of IoT devices categorized in a specific group.

In a specific implementation, the learned state transition pattern recognition engine 910 can use deep learning to identify recognized behavior patterns of IoT devices in operation as either or both characteristic or common behavior patterns of IoT devices in a group. For example, the learned state transition pattern recognition engine 910 can identify a recognized behavior pattern as a characteristic behavior pattern of a group, e.g. it regularly occurs at an IoT device in operation. In another example, the learned state transition pattern recognition engine 910 can identify a recognized behavior pattern as a common behavior pattern of a group.

In a specific implementation, the deep learning behavior pattern recognition engine 908 and the learned state transition behavior pattern recognition engine 910 operate together to recognize behavior patterns of IoT devices. In operating together to recognize behavior patterns of IoT devices, the deep learning behavior pattern recognition engine 908 and the learned state transition behavior pattern recognition engine 910 can apply corresponding deep learning behavior pattern recognition and learned state transition-based learning pattern recognition to observed behaviors until a behavior pattern for the observed behaviors is identified. For example, if observed behaviors fail to conform to a recognized behavior pattern, e.g. as indicated through a neural network graph or a state transition graph, then either or both the deep learning behavior pattern recognition engine 908 and the learned state transition behavior pattern recognition engine 910 can update corresponding models, e.g. the neural network graph or the state transition graph, to include a behavior pattern including the observed behaviors.

The behavior pattern modeling engine 912 is intended to represent an engine that functions to maintain context-based IoT device grouping models. In maintaining a context-based IoT device grouping model, the behavior pattern modeling engine 912 can add recognized behavior patterns, both characteristic and common, to a context-based IoT device grouping model. In maintaining a context-based IoT device grouping model, the behavior pattern modeling engine 912 can generate and update a context-based IoT device grouping model. For example, the behavior pattern modeling engine 912 can update a context-based IoT device grouping model to include newly discovered characteristic or common behavior patterns of an IoT device in operation. In another example, if a behavior pattern previously identified as characteristic or common has been identified as non-characteristic or uncommon, e.g. deviating from a characteristic or common behavior pattern, then the behavior pattern modeling engine 912 can update a context-based IoT device grouping model to indicate the behavior pattern is non-characteristic or uncommon. The behavior pattern modeling engine 912 can maintain context-based IoT device grouping models based on behavior patterns of IoT devices recognized through an applicable technique. For example, the behavior pattern modeling engine 912 can maintain context-based IoT device grouping models based on behavior patterns recognized through either or both deep learning behavior pattern recognition and learned state transition behavior pattern recognition.

In a specific implementation, the behavior pattern modeling engine 912 functions to maintain context-based IoT device grouping models based on determined contexts of IoT devices. In maintaining context-based IoT device grouping models based on contexts of IoT devices, the behavior pattern modeling engine 912 can associate a context-based IoT device grouping model with one or a plurality of contexts of an IoT device. For example, if a context-based IoT device grouping model was created using recognized behavior patterns of IoT devices categorized in a specific group, then the behavior pattern modeling engine 912 can associate the model with the specific group. Further, in maintaining context-based IoT device grouping models based on contexts of IoT devices, the behavior pattern modeling engine 912 can associate specific behavior patterns within the model with contexts of IoT devices. For example, if a behavior pattern was formed from events observed at an IoT device when the IoT device was executing a web browser, then the behavior pattern modeling engine 912 can associate the behavior pattern with the context of executing a web browser. Further, the behavior pattern modeling engine 912 can associate a context-based IoT device grouping or behavior patterns in the model with one or a combination of device sensor events, session events, application events, user events, protocol events, and status events. For example, if a behavior pattern in a model was recognized based on session events, then the behavior pattern modeling engine 912 can associate the model with session events.

In a specific implementation, the behavior pattern modeling engine 912 functions to maintain a context-based IoT device grouping as part of either or both a personality of an IoT device and a profile of a group of IoT devices. For example, the behavior pattern modeling engine 912 can include a context-based IoT device grouping model maintained using recognized behavior patterns of a specific group of IoT devices as part of a personality for the IoT devices in the group. In another example, the behavior pattern modeling engine 912 can include a context-based IoT device grouping model maintained using recognized behavior patterns of IoT devices in a specific group as part of a profile of the specific group of IoT devices.

In a specific implementation, the behavior pattern modeling engine 912 functions to maintain a context-based IoT device grouping model in a first language and generate a description of the IoT device grouping model in a common language, as included as part of the model. For example, the behavior pattern modeling can describe recognized behavior patterns in a context-based IoT device grouping model in JSON. In another example, the behavior pattern modeling engine 912 can write group description labels in a common language, e.g. in JSON, for use in labeling groups corresponding to recognized behavior patterns. As a result, users are able to interpret why an IoT device is categorized in a group rather than just simply being informed simply that the IoT device is categorized in a group.

The context-based IoT device grouping model datastore 914 is intended to represent a datastore that functions to store context-based IoT device grouping model data, such as the context-based IoT device grouping model datastores described in this paper. Context-based IoT device grouping model data stored in the context-based IoT device grouping model datastore 914 can be maintained by an applicable engine for maintaining context-based IoT device grouping models based on recognized behavior patterns of IoT devices in operation, such as the behavior pattern modeling engines described in this paper. Context-based IoT device grouping model data stored in the context-based IoT device grouping model datastore 914 can indicate context-based IoT device grouping models, contexts associated with context-based IoT device grouping models, descriptions of context-based IoT device grouping models, e.g. written in a common language, and group description labels included as part of a context-based IoT device grouping model.

In an example of operation of the example context-based IoT device grouping model maintenance system 902 shown in FIG. 9, the IoT device context determination engine 904 determines a context of an IoT device in operation. In the example of operation of the example system shown in FIG.

9, the IoT device behavior identification engine 906 determines behaviors of an IoT device in operation. Further, in the example of operation of the example system shown in FIG. 9, the deep learning behavior pattern recognition engine 908 recognizes behavior patterns of an IoT device in operation through deep learning machine learning using the behaviors identified by the IoT device behavior identification engine 906. In the example of operation of the example system shown in FIG. 9, the learned state transition behavior pattern recognition engine 910 recognized behavior patterns of the IoT device in operation through learned state transition-based learning using the behaviors identified by the IoT device behavior identification engine 906. Additionally, in the example of operation of the example system shown in FIG. 9, the behavior pattern modeling engine 912 maintains a context-based IoT device grouping model based on the behavior patterns recognized by the deep learning behavior pattern recognition engine 908 and the learned state transition behavior pattern recognition engine 910.

Figure 10:
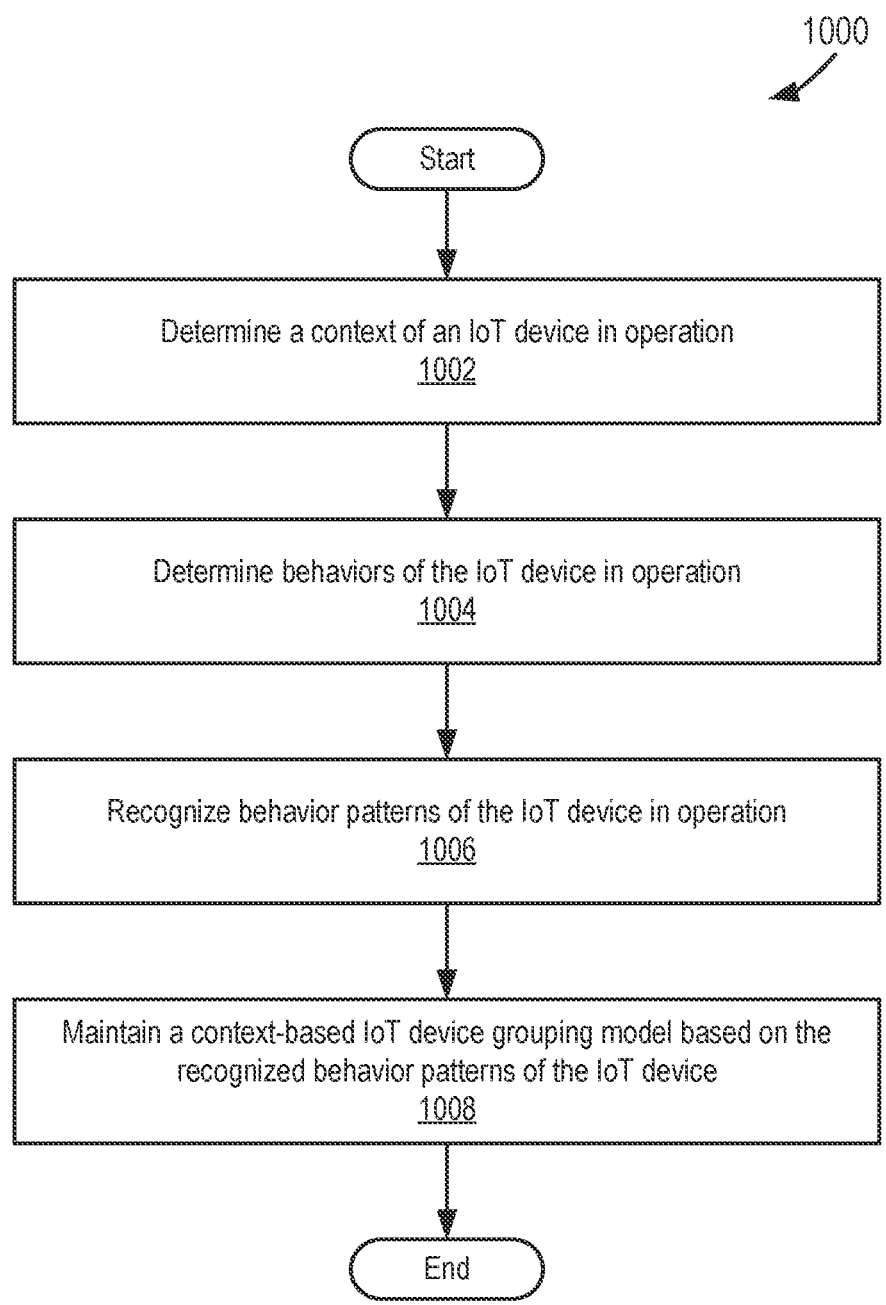
FIG. 10 depicts a flowchart of an example of a method for maintaining a context-based IoT device grouping for use in grouping/labeling IoT devices in operation.

FIG. 10 depicts a flowchart 1000 of an example of a method for maintaining a context-based IoT device grouping model for use in performing grouping of IoT devices in operation. The flowchart 1000 begins at module 1002, where a context of an IoT device in operation is determined. An applicable engine for determining a context of an IoT device in operation, such as the IoT device context determination engines described in this paper, can determine a context of an IoT device in operation. A context of an IoT device can be determined based on events occurring in the operation of the IoT device. For example, if an IoT device is communicating with a web server, then it can be determined a web browser is executing at the IoT device. Additionally, a context of an IoT device can be determined based on received user input. For example, a user can specify a type of data communicable by an IoT device and an IoT device context can be determined indicating the type of communicable data by the IoT device.

The flowchart 1000 continues to module 1004, where behaviors of the IoT device in operation are determined. An applicable engine for determining behaviors of an IoT device in operation, such as the IoT device behavior identification engines described in this paper, can determine behaviors of the IoT device in operation. Behaviors of the IoT device in operation can be determined based on aggregated events occurring in the operation of the IoT device. More specifically, behaviors of an IoT device in operation can be determined from event metadata of aggregated events collected in an event buffer.

The flowchart 1000 continues to module 1006, where behavior patterns of the IoT device in operation are recognized. Behavior patterns of the IoT device in operation can be recognized by an applicable engine for using deep learning machine learning to recognize behavior patterns of an IoT device, such as the deep learning behavior pattern recognition engines described in this paper. Additionally, behavior patterns of the IoT device in operation can be recognized by an applicable engine for using learned state transition-based learning to recognize behavior patterns of an IoT device, such as the learned state transition pattern recognition engines described in this paper. Behavior patterns of the IoT device in operation can be recognized from determined behaviors of the IoT device in operation.

The flowchart 1000 continues to module 1008, where a context-based IoT device grouping model is maintained based on the recognized behavior patterns of the IoT device. An applicable engine for maintaining context-based IoT device grouping model, such as the behavior pattern modeling engines described in this paper, can maintain a context-based IoT device grouping model. A context-based IoT device grouping model can be maintained based on either or both recognized behavior patterns and contexts of an IoT device in operation.

Figure 11:
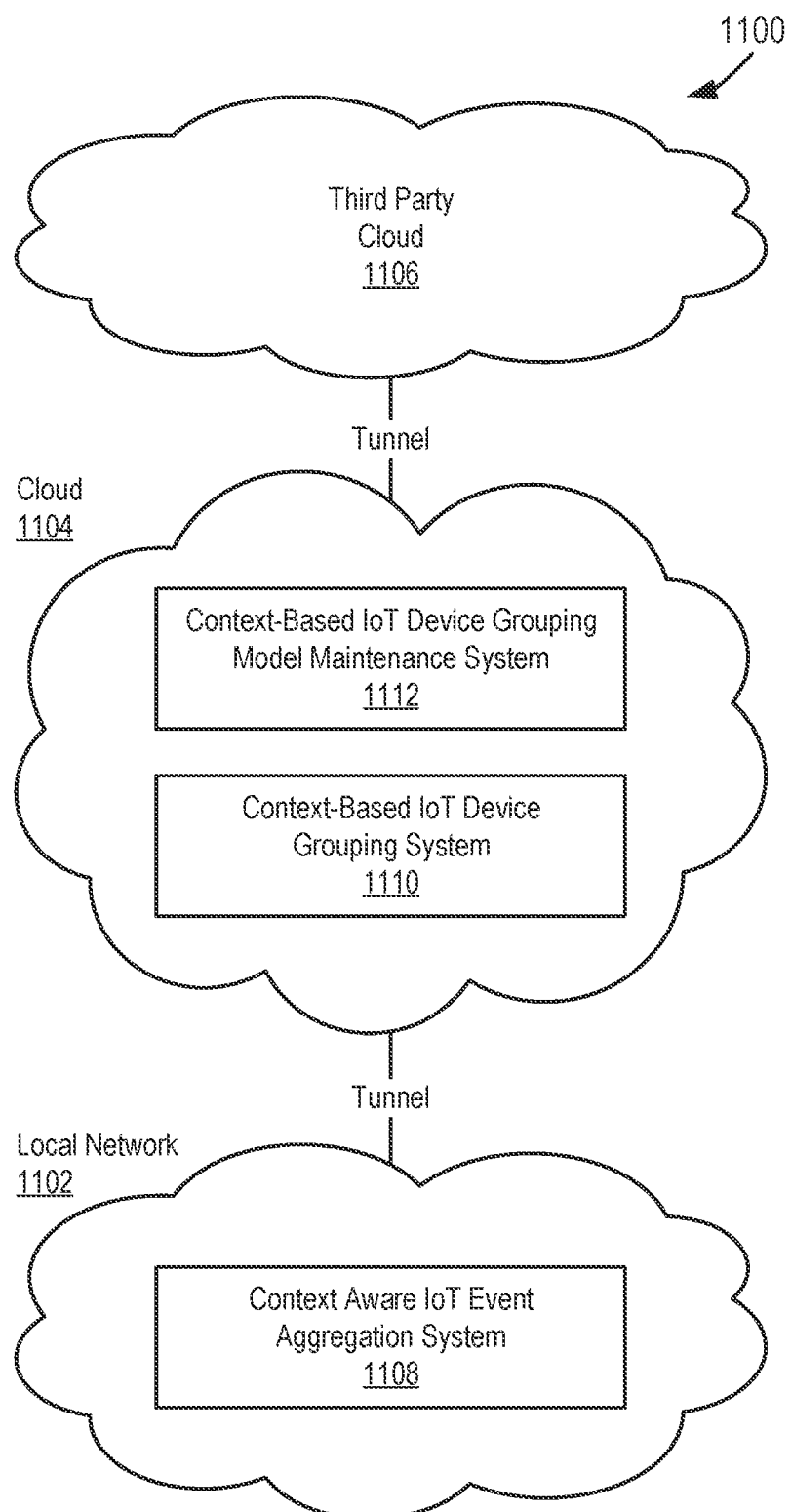
FIG. 11 depicts a diagram of an example of a system for grouping/labeling IoT devices in operation.

FIG. 11 depicts a diagram 1100 of an example of a system for determining undesired behavior of IoT devices in operation. The system shown in the example of FIG. 11 includes a local network 1102, a cloud 1104, and a third party cloud 1106. The local network 1102 is intended to represent a network formed by at least one IoT device and a local appliance.

In the example of FIG. 11, the local network 1102 includes a context aware IoT aggregation system 1108. The context aware IoT aggregation system 1108 is intended to represent a system that functions to aggregate events for purposes of detecting undesired behavior in operation of IoT devices, such as the context aware IoT aggregation systems described in this paper. The context aware IoT aggregation system 1108 can be implemented as part of a local appliance forming part of the local network 1102. In being implemented as part of a local appliance, the context aware IoT aggregation system 1108 can locally aggregate events for purposes of grouping IoT devices in operation.

In the example system shown in FIG. 11, the cloud 1104 includes a context-based IoT device grouping system 1110 and a context-based IoT device grouping model maintenance system 1112. The context-based IoT device grouping system 1110 is intended to represent a system that functions to perform grouping of IoT devices based on context, such as the context-based IoT device grouping systems described in this paper. The context-based IoT device grouping model maintenance system 1112 is intended to represent a system that functions to maintain context-based IoT device grouping models for purposes of performing grouping of the IoT devices in operation, such as the context-based IoT device grouping model maintenance system described in this paper. The cloud 1104 can be specific to a private entity. The context-based IoT device grouping system 1110 can receive event metadata of aggregated events through VPN tunnels from the context aware IoT device aggregation system 1108 implemented at the local network 1102. The context-based IoT device grouping system 1110 can use received event metadata of aggregated events to perform grouping of the IoT devices in operation.

In the example system shown in FIG. 11, the third party cloud 1106 is intended to represent a cloud that receives context-based IoT device grouping models through VPN tunnels. The third party cloud 1106 receives context-based IoT device grouping model data indicating context-based IoT device grouping models through VPN tunnels from the context-based IoT device grouping model maintenance system 1112 implemented at the cloud 1104. The third party cloud 1106 can be associated with or used by a third party management system for managing IoT devices.

Figure 12:
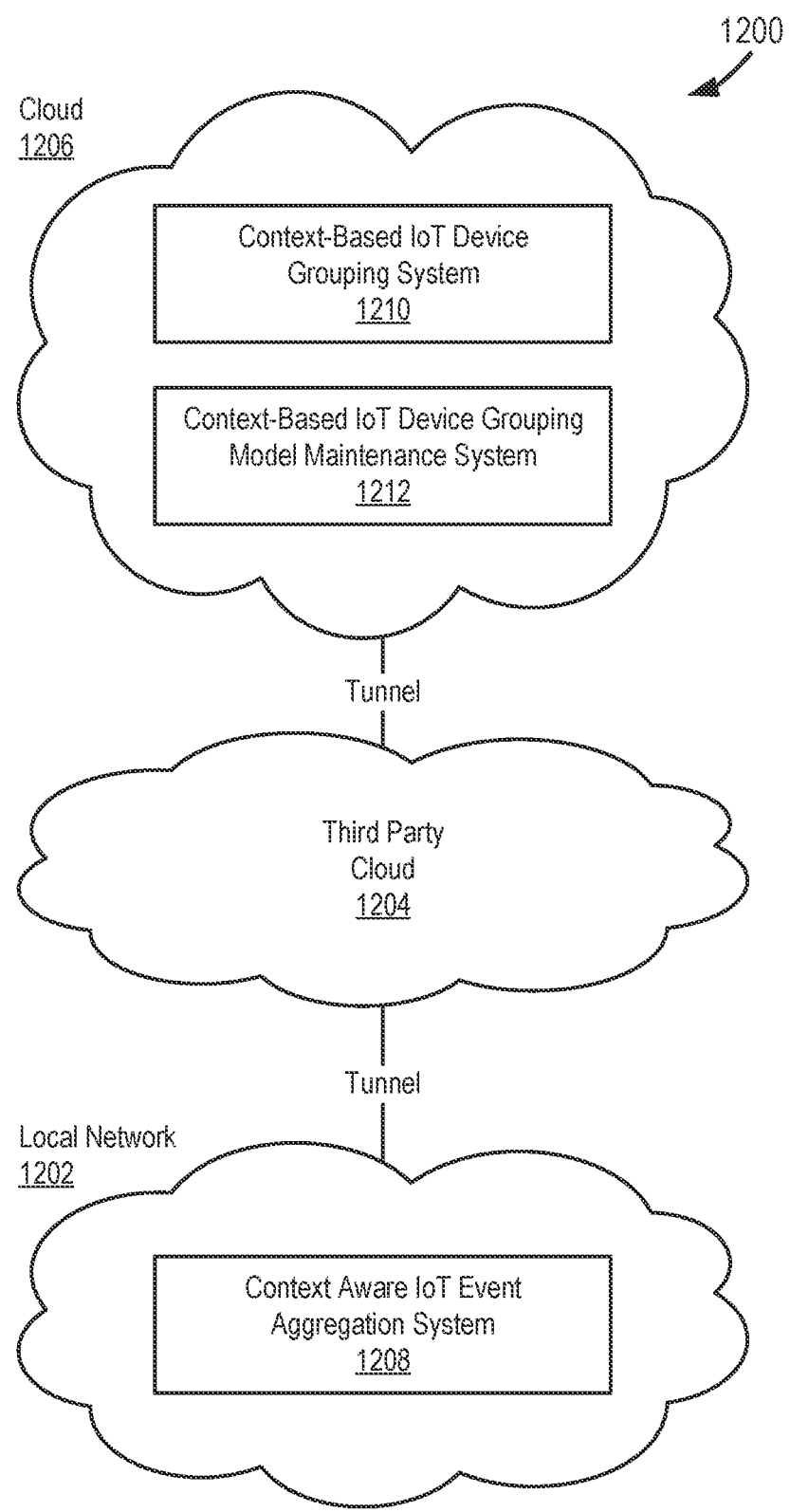
FIG. 12 depicts a diagram of another example of a system for grouping/labeling IoT devices in operation.

FIG. 12 depicts a diagram 1200 of another example of a system for grouping IoT devices in operation. The system shown in the example of FIG. 12 includes a local network 1202, a third party cloud 1204, and a cloud 1206. The local network 1202 is intended to represent a network formed by at least one IoT device and a local appliance. The local network 1202 includes a context aware IoT event aggregation system 1208. The context aware IoT aggregation system 1208 is intended to represent a system that functions to aggregate events for purposes of grouping IoT devices in operation, such as the context aware IoT aggregation systems described in this paper. The context aware IoT aggregation system 1208 can be implemented as part of a local appliance forming part of the local network 1202. In being implemented as part of a local appliance, the context aware IoT aggregation system 1208 can locally aggregate events for purposes of grouping IoT devices in operation.

In the system shown in the example of FIG. 12, the third party cloud 1204 receives event metadata from the context aware IoT event aggregation system 1208 implemented at the local network 1202. The third party cloud 1204 can be associated with or used by a third party management system for managing IoT devices.

In the example system shown in FIG. 12, the cloud 1206 includes a context-based IoT device grouping system 1210 and a context-based IoT device grouping model maintenance system 1212. The context-based IoT device grouping system 1210 is intended to represent a system that functions to perform grouping of IoT devices based on context, such as the context-based IoT device grouping systems described in this paper. The context-based IoT device grouping model maintenance system 1212 is intended to represent a system that functions to maintain context-based IoT device grouping models for purposes of performing grouping of the IoT devices in operation, such as the context-based IoT device grouping model maintenance system described in this paper. The context-based IoT device grouping system 1210 can receive event metadata, through VPN tunnels from the third party cloud 1204, which are received at the third party cloud 1204 from the context aware IoT event aggregation system 1208 implemented at the local network 1202. The context-based IoT device grouping system 1210 can use event metadata received through VPN tunnels from the third party cloud 1204 to perform grouping of IoT devices in operation.

The context-based IoT device grouping model maintenance system 1212 can send maintained context-based IoT device grouping models back to the third party cloud 1204 through VPN tunnels. The context-based IoT device grouping system 1210 can send grouping/labeling result reports back to the third party cloud 904 through VPN tunnels.

Figure 13:
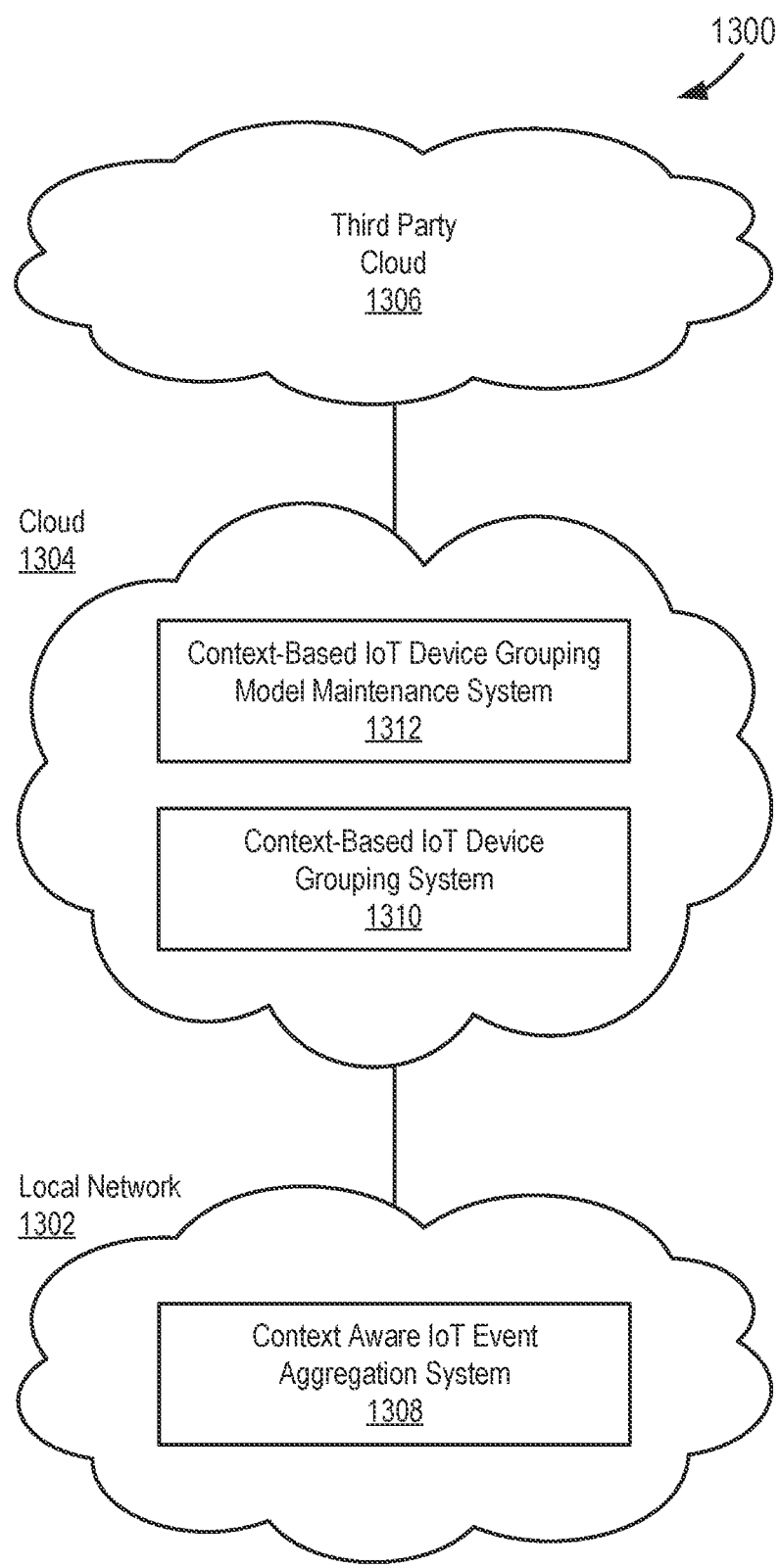
FIG. 13 depicts a diagram of still another example of a system for grouping/labeling IoT devices in operation.

FIG. 13 depicts a diagram 1300 of an example of a system for performing grouping of IoT devices in operation. The system shown in the example of FIG. 13 includes a local network 1302, a cloud 1304, and a third party cloud 1306. The local network 1302 is intended to represent a network formed by at least one IoT device and a local appliance.

In the example of FIG. 13, the local network 1302 includes a context aware IoT aggregation system 1308. The context aware IoT aggregation system 1308 is intended to represent a system that functions to aggregate events for purposes of performing grouping of IoT devices in operation, such as the context aware IoT aggregation systems described in this paper. The context aware IoT aggregation system 1308 can be implemented as part of a local appliance forming part of the local network 1302. In being implemented as part of a local appliance, the context aware IoT aggregation system 1308 can locally aggregate events for purposes of performing grouping of IoT devices in operation.

In the example system shown in FIG. 13, the cloud 1304 includes a context-based IoT device grouping system 1310 and a context-based IoT device grouping model maintenance system 1312. The context-based IoT device grouping system 1310 is intended to represent a system that functions to perform grouping of IoT devices in operation based on context, such as the context-based IoT device grouping systems described in this paper. The context-based IoT device grouping model maintenance system 1312 is intended to represent a system that functions to maintain context-based IoT device grouping models for purposes of performing grouping of the IoT devices in operation, such as the context-based IoT device grouping model maintenance system described in this paper. The cloud 1304 can be specific to a private entity. The context-based IoT device grouping system 1310 can receive event metadata of aggregated events from the context aware IoT device aggregation system 1308 implemented at the local network 1302. The context-based IoT device grouping system 1310 can use received event metadata of aggregated events to perform grouping of IoT devices in operation.

In the example system shown in FIG. 13, the third party cloud 1306 is intended to represent a cloud that receives context-based IoT device grouping models. The third party cloud 1306 receives context-based IoT device grouping model data indicating context-based IoT device grouping models from the context-based IoT device grouping model maintenance system 1312 implemented at the cloud 1304. The third party cloud 1306 can be associated with or used by a third party management system for managing IoT devices.

Figure 14:
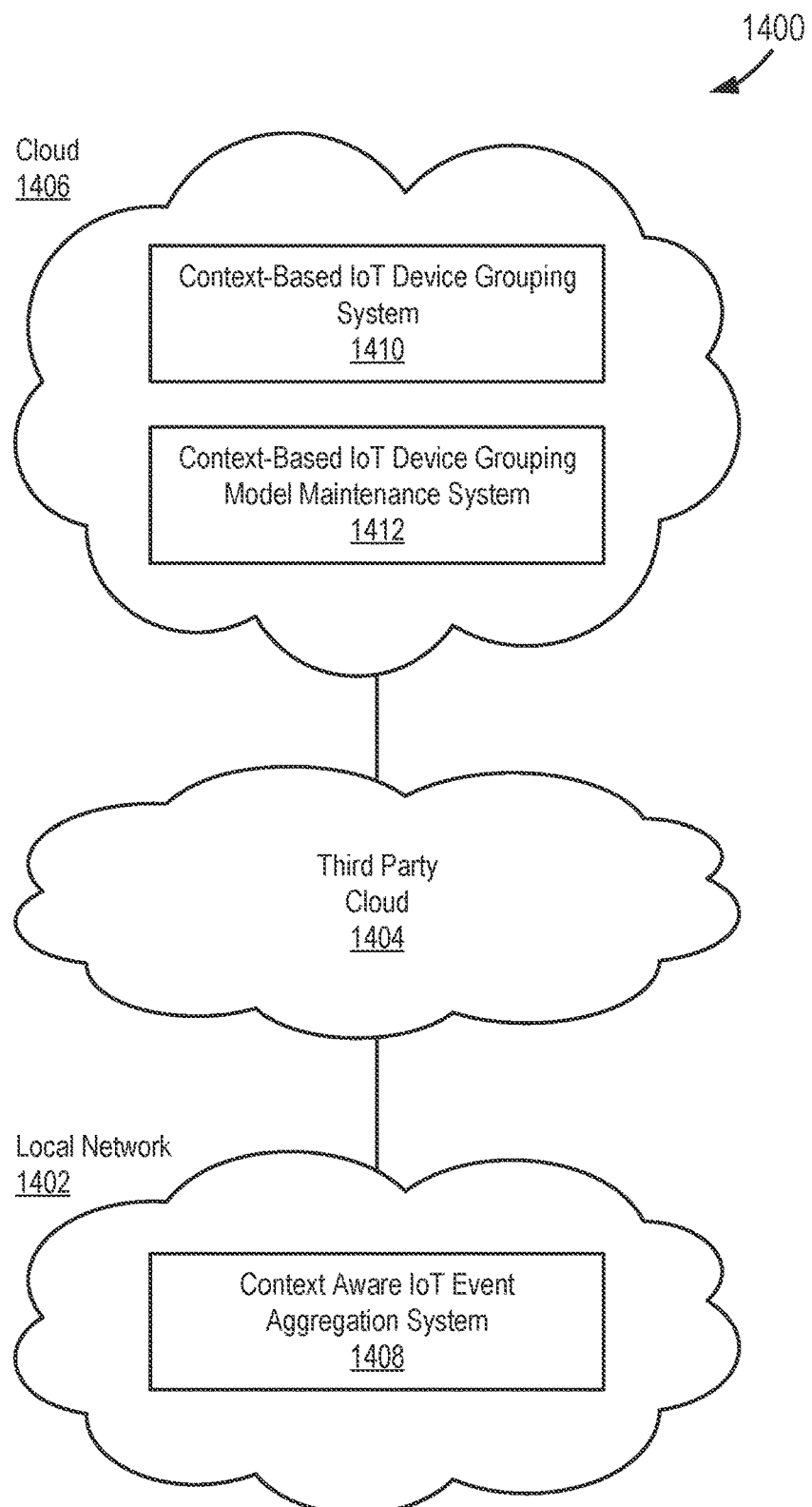
FIG. 14 depicts a diagram of still another example of a system for grouping/labeling IoT devices in operation.

FIG. 14 depicts a diagram 1400 of another example of a system for grouping IoT devices in operation. The system shown in the example of FIG. 14 includes a local network 1402, a third party cloud 1404, and a cloud 1406. The local network 1402 is intended to represent a network formed by at least one IoT device and a local appliance. The local network 1402 includes a context aware IoT event aggregation system 1408. The context aware IoT aggregation system 1408 is intended to represent a system that functions to aggregate events for purposes of performing grouping of IoT devices in operation, such as the context aware IoT aggregation systems described in this paper. The context aware IoT aggregation system 1408 can be implemented as part of a local appliance forming part of the local network 1402. In being implemented as part of a local appliance, the context aware IoT aggregation system 1408 can locally aggregate events for purposes of performing grouping of IoT devices in operation.

In the system shown in the example of FIG. 14, the third party cloud 1404 receives event metadata from the context aware IoT event aggregation system 1408 implemented at the local network 1402. The third party cloud 1404 can be associated with or used by a third party management system for managing IoT devices.

In the example system shown in FIG. 14, the cloud 1406 includes a context-based IoT device grouping system 1410 and a context-based IoT device grouping model maintenance system 1412. The context-based IoT device grouping system 1410 is intended to represent a system that functions to perform grouping of IoT devices based on context, such as the context-based IoT device grouping systems described in this paper. The context-based IoT device grouping model maintenance system 1412 is intended to represent a system that functions to maintain context-based IoT device grouping models for purposes of performing grouping of the IoT devices in operation, such as the context-based IoT device grouping model maintenance system described in this paper. The context-based IoT device grouping system 1410 can receive event metadata, from the third party cloud 1404, which are received at the third party cloud 1404 from the context aware IoT event aggregation system 1408 implemented at the local network 1402. The context-based IoT device grouping system 1410 can use event metadata received from the third party cloud 1104 to perform grouping of IoT devices in operation.

The context-based IoT device grouping model maintenance system 1412 can send maintained context-based IoT device grouping models back to the third party cloud 1404. The context-based IoT device grouping system 1410 can send grouping/labeling result reports back to the third party cloud 1404.

Figure 15:
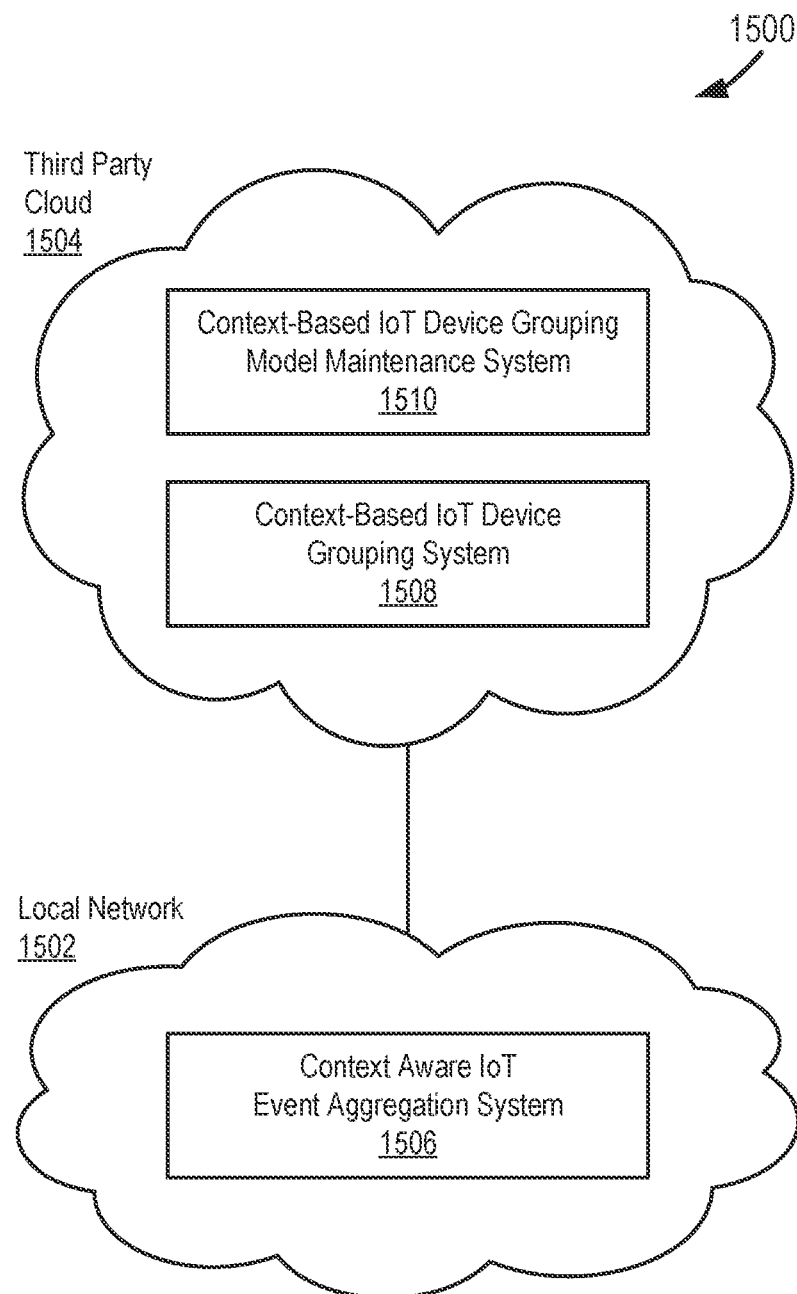
FIG. 15 depicts a diagram of still another example of a system for grouping/labeling IoT devices in operation.

FIG. 15 depicts a diagram 1500 of another example of a system for performing grouping of IoT devices in operation. The system shown in the example of FIG. 15 includes a local network 1502 and a third party cloud 1504. The local network 1502 includes a context aware IoT event aggregation system 1506. The context aware IoT event aggregation system 1506 is intended to represent a system that functions to aggregate events for purposes of performing grouping of IoT devices in operation, such as the context aware IoT event aggregation systems described in this paper.

In the system shown in the example of FIG. 15, the third party cloud 1504 includes a context-based IoT device grouping system 1508 and a context-based IoT device grouping model maintenance system 1510. The context-based IoT device grouping system 1508 is intended to represent an applicable system for grouping IoT devices based on context, such as the context-based IoT device grouping systems described in this paper. The context-based IoT device grouping system 1508 can perform grouping of IoT devices in operation based on event metadata received from the context aware IoT device aggregation system 1506. The context-based IoT device grouping model maintenance system 1510 is intended to represent a system that functions to maintain context-based IoT device grouping models for purposes of performing grouping of the IoT devices in operation, such as the context-based IoT device grouping model maintenance system described in this paper.

Figure 16:
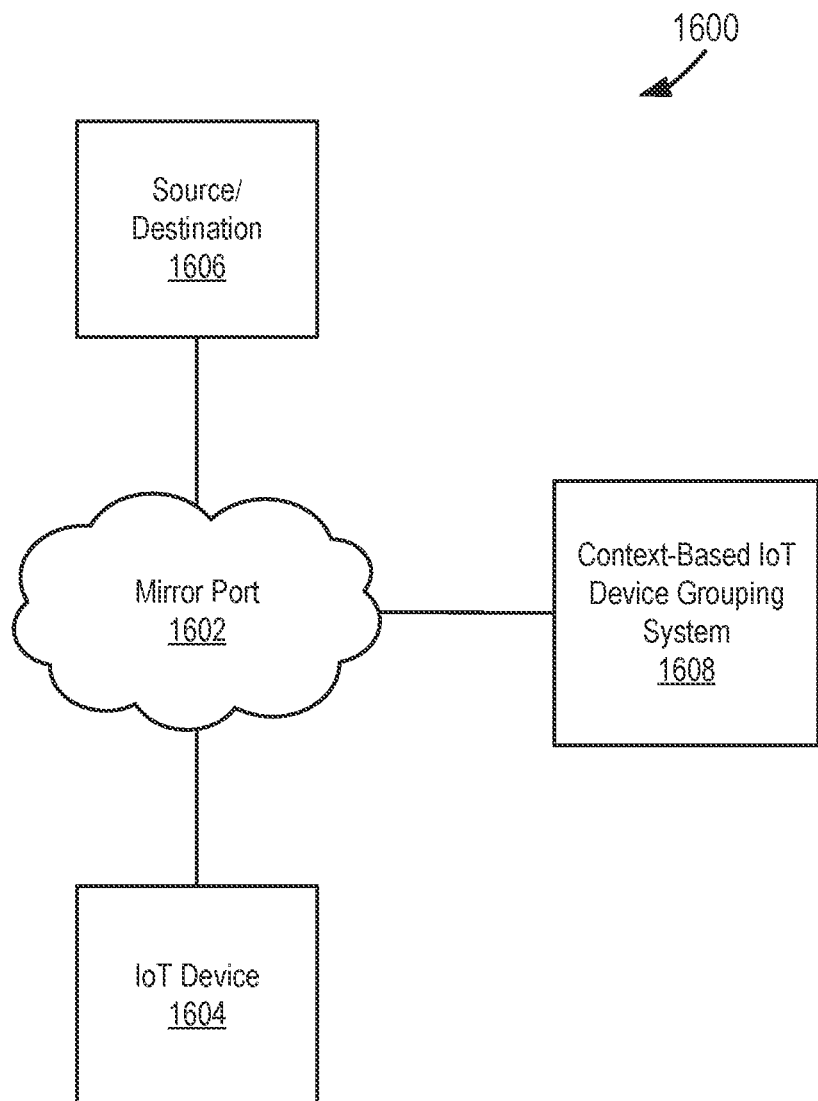
FIG. 16 depicts a diagram of an example of a system for grouping/labeling IoT devices through a mirror port.

FIG. 16 depicts a diagram 1600 of an example of a system for detecting undesired behavior in IoT device operation through a mirror port. The system shown in the example of FIG. 16 includes a mirror port 1602, an IoT device 1604, a source/destination 1606, and a context-based IoT device grouping system 1608. The mirror port 1602 is intended to represent a device that functions to perform port mirroring on another port. The mirror port 1602 can be used to obtain data packets transmitted to and from IoT devices without disrupting the flow of the data packets. The mirror port 1602 can be implemented as part of switches or other applicable networking devices. Additionally, the mirror port 1602 can be implemented on network devices in a LAN of IoT devices, or on network devices in a WAN of IoT devices. For example, the mirror port 1602 can be implemented as part of a local router in an enterprise network of IoT devices. Further in the example, in being implemented as part of the local router in an enterprise network, the mirror port 1602 can be used to obtain data packets transmitted between IoT devices in the enterprise network, e.g. intranetwork traffic.

In the example of FIG. 16, the IoT device 1604 is intended to represent a device that includes wired or wireless interfaces through which the IoT device 1604 can send and receive data over wired and wireless connections. The IoT device 1604 can include unique identifiers which can be used in the transmission of data through a network. Unique identifiers of the IoT device 1604 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference.

In the example of FIG. 16, the source/destination 1606 is intended to represent a system accessible by IoT devices through, e.g., a WAN. For example, the source/destination 1606 can be a system that an IoT device 1604 communicates with over the Internet. Alternatively, the source/destination 1606 can be a system or device within a LAN of an IoT device. For example, the source/destination 1606 can be another IoT device in a LAN over which an IoT device communicates.

In the example of FIG. 16, the context-based IoT device grouping system 1608 is intended to represent a system that functions to perform grouping of IoT devices in operation, such as the context-based IoT device grouping systems described in this paper. The context-based IoT device grouping system 1608 functions to perform grouping of IoT devices in operation based on event metadata generated from data packets transmitted to and from the IoT devices 1604. The context-based IoT device grouping system 1608 can obtain event metadata through a mirror port, without interrupting the flow of the data packets between sources and destinations.

Figure 17:
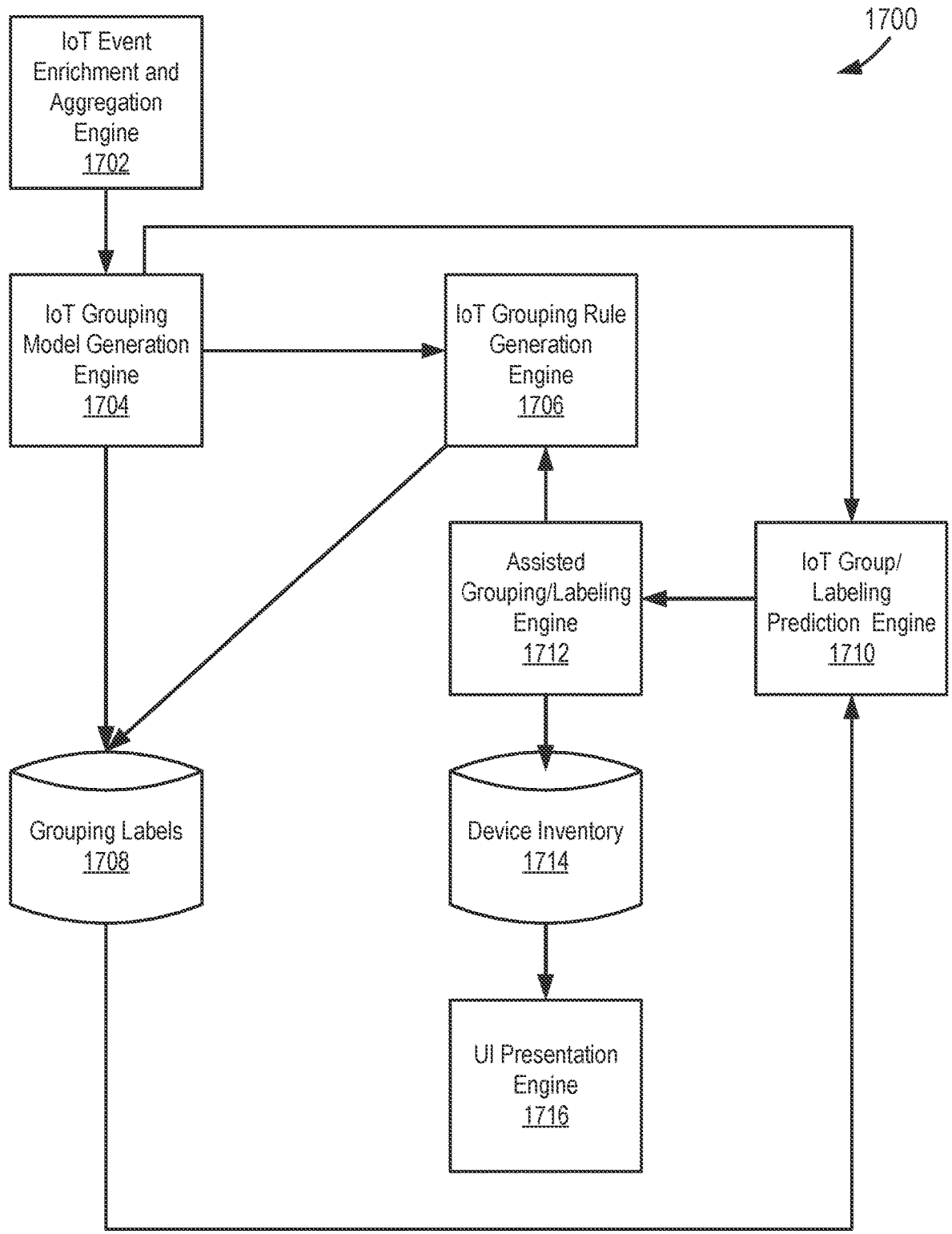
FIG. 17 depicts a diagram of an example of a IoT device grouping/labeling management system.

FIG. 17 depicts a diagram 1700 of an example of a IoT device grouping/labeling management system. The example system shown in FIG. 17 can be included as part of an applicable system for grouping and labeling IoT devices in operation based on context, such as the context aware IoT device identification systems described in this paper. Applicable portions of the system shown in FIG. 17 can be implemented locally with respect to an IoT device, e.g. at a device within a LAN of the IoT device. Additionally, applicable portions of the system shown in FIG. 17 can be implemented remote from an IoT device, e.g. in a cloud.

The example system shown in FIG. 17 includes an IoT device event enrichment and aggregation engine 1702, an IoT grouping model generation engine 1704, an IoT grouping rule generation engine 1706, a grouping label datastores 1708, an IoT grouping/labeling prediction engine 1710, an assisted grouping/labeling engine 1712, a device inventory 1714, and a UI presentation engine 1716. In the system show in FIG. 17, the IoT device event enrichment and aggregation engine 1702 is intended to represent an engine that functions to enrich raw event metadata received based on operation of an IoT device. The IoT device event enrichment and aggregation engine 1702 can receive raw metadata in the form of data packets or portions of data packets transmitted to and from an IoT device in operation of the IoT device. In enriching raw event metadata, the IoT device event enrichment and aggregation engine 1702 can identify an IoT device and assign a context to the IoT device.

The IoT grouping model generation engine 1704 is intended to represent an engine that receives enriched metadata to generate a context-based IoT device grouping model. The IoT grouping model generation engine 1704 receives the enriched metadata from the IoT device event enrichment and aggregation engine 1702. In maintaining a context-based IoT device grouping model based on enriched metadata, the IoT device grouping model generation engine 1704 can establish profiles of groups of IoT devices. Additionally, in maintaining the context-based IoT device grouping model, the IoT device grouping model generation engine 1704 can aggregate and create permutations of the enriched metadata to generate aggregated metadata permutations. For example, the IoT device grouping model generation engine 1704 can group together all enriched metadata related to streaming events at the IoT device together to generate aggregated metadata permutations.

The IoT grouping rule generation engine 1706 is intended to represent an engine that functions to define an IoT device grouping/labeling rule based on the context-based IoT device grouping model generated by the IoT grouping model generation engine 1704. The IoT grouping rule generation engine 1706 stores defined labels and group profile corresponding to one or more defined labels in the grouping label datastores 1708.

The IoT grouping/labeling prediction engine 1710 is intended to represent an engine that functions to predict grouping and labeling of IoT device in operation based on the defined labels and group profiles that are defined by the IoT grouping rule generation engine 1706 and stored in the grouping label datastore 1708.

The assisted grouping/labeling engine 1712 is intended to represent an engine that functions to perform assisted grouping/labeling based on a prediction result made by the IoT grouping/labeling prediction engine 1710. For example, when the grouping/labeling prediction is not successfully obtained in the prediction result made by the IoT grouping/labeling prediction engine 1710, the assisted grouping/labeling engine 1712 carries out assisted grouping/labeling based on offline inputs made by users, customers, administrators, vendors, and so on, which are triggered, for example, by inquiries made by the assisted grouping/labeling engine 1712. The assisted grouping/labeling engine 1712 provides results of assisted grouping/labeling to the IoT grouping rule generation engine 1706, such that the IoT grouping rule generation engine 1706 can update the IoT device grouping/labeling rule based on the assisted grouping/labeling carried out by the assisted grouping/labeling engine 1712. The assisted grouping/labeling engine 1712 also stores a result of the grouping/labeling prediction, along with a result of the assisted grouping/labeling, if any, to the device inventory 1714.

The UI presentation engine 1716 is intended to represent an engine that functions to perform presentation of a result of grouping/labeling prediction that is made based on the IoT device grouping/labeling rule and/or the assisted grouping/labeling based on offline inputs. For example, the UI presentation engine 1716 visually presents the result of grouping/labeling prediction and/or the assisted grouping/labeling to a customer dashboard as a graphical user interface (GUI), such that the customer can manage IoT devices in operation based on the result of grouping/labeling prediction and/or the assisted grouping/labeling.

Figure 18:
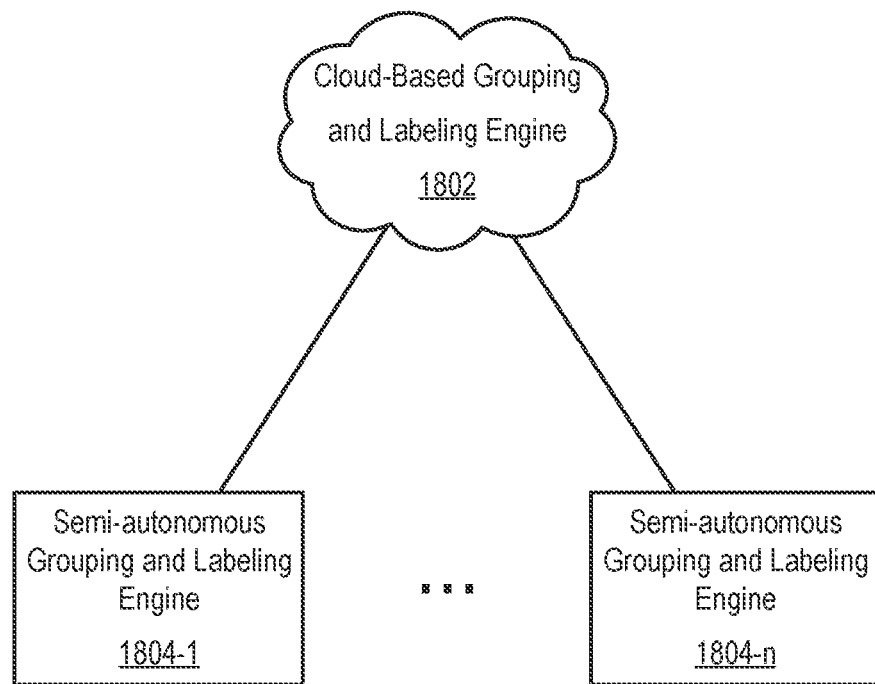
FIG. 18 is a diagram of an example of a cloud-based grouping and labeling engine with semi-autonomous grouping and labeling engines.

FIG. 18 is a diagram of an example of a cloud-based grouping and labeling engine with semi-autonomous grouping and labeling engines. The diagram 1800 includes a cloud-based grouping and labeling engine 1802 and a plurality of semi-autonomous grouping and labeling engines 1804-1 to 1804-n (collectively, the semi-autonomous grouping and labeling engines 1804). FIG. 18 is intended to illustrate how grouping and labeling functionality can be carried out at a relatively low level at the semi-autonomous grouping and labeling engines 1804, which may be associated with individual subnets, distinct enterprise networks, home networks, or the like. The grouping and labeling functionality can also be carried out at a relatively high level at the cloud-based grouping and labeling engine 1802.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

What is claimed is:

1. A method comprising:
   identifying a set of raw events associated with a first Internet of Things (IoT) device in operation;
   identifying a context of the first IoT device in operation and enriching at least some raw events in the set of raw events based at least in part on obtained additional contextual information to form a set of enriched events;
   aggregating at least some of the raw events included in the set of raw events to form a set of aggregated events;
   generating a context-based IoT device grouping model based at least in part on the set of enriched events, the set of aggregated events, and events associated with a second IoT device in operation;
   applying the generated context-based IoT device grouping model to determine that a third IoT device belongs to a particular group; and
   detecting, as an undesired behavior, a deviation by the third IoT device from group behavior, and generating an alert in response.

2. The method of claim 1, further comprising: transforming at least a portion of the raw events included in the set of raw events into a format suitable for grouping and labeling the first and second IoT devices.

3. The method of claim 1, further comprising: transforming at least a portion of the raw events included in the set of raw events into discrete events.

4. The method of claim 1, further comprising: transforming at least a portion of the raw events included in the set of raw events into composite events comprising multiple event parameters.

5. The method of claim 1, wherein the set of raw events includes one or more messages transmitted to the first IoT device, and wherein the method further comprises: examining the one or more messages transmitted to the first IoT device to determine an event which can subsequently be timestamped to create a formatted event of the first IoT device in operation.

6. The method of claim 1, wherein identifying the set of raw events of the first IoT device in operation is performed at least in part within a data rollup window, and wherein the method further comprises: generating formatted events of the first IoT device within the data rollup window.

7. The method of claim 1, wherein identifying the set of raw events of the first IoT device in operation is performed at least in part within a data rollup window, and wherein the method further comprises: aggregating events during the data rollup window to form the set of aggregated events.

8. The method of claim 1, further comprising: transmitting event metadata of the set of aggregated events to a remote system for purposes of performing grouping of the first and second IoT devices.

9. The method of claim 1, further comprising: determining that grouping the first and third IoT devices is unsuccessful, and carrying out assisted grouping and labeling of the first and third IoT devices.

10. The method of claim 1, further comprising: determining that a new IoT device label has been added, and performing a new grouping operation to the first and second IoT devices.

11. A system comprising:
   a processor configured to:
      identify a set of raw events associated with a first Internet of Things (IoT) device in operation;
      identify a context of the first IoT device in operation and enrich at least some raw events in the set of raw events based at least in part on obtained additional contextual information to form a set of enriched events;

aggregate at least some of the raw events included in the set of raw events to form a set of aggregated events;

generate a context-based IoT device grouping model based at least in part on the set of enriched events, the set of aggregated events, and events associated with a second IoT device in operation;

apply the generated context-based IoT device grouping model to determine that a third IoT device belongs to a particular group; and detect, as an undesired behavior, a deviation by the third IoT device from group behavior, and generate an alert in response.

12. The system of claim 11, wherein the processor is further configured to: transform at least a portion of the raw events included in the set of raw events into a format suitable for grouping and labeling the first and second IoT devices.

13. The system of claim 11, wherein the processor is further configured to: transform at least a portion of the raw events included in the set of raw events into discrete events.

14. The system of claim 11, wherein the processor is further configured to: transform at least a portion of the raw events included in the set of raw events into composite events comprising multiple event parameters.

15. The system of claim 11, wherein the set of raw events includes one or more messages transmitted to the first IoT device, and wherein the processor is further configured to: examine the one or more messages transmitted to the first IoT device to determine an event which can subsequently be timestamped to create a formatted event of the first IoT device in operation.

16. The system of claim 11, wherein identifying the set of raw events of the first IoT device in operation is performed at least in part within a data rollup window, and wherein the processor is further configured to: generate formatted events of the first IoT device within the data rollup window.

17. The system of claim 11, wherein identifying the set of raw events of the first IoT device in operation is performed at least in part within a data rollup window, and wherein the processor is further configured to: aggregate events during the data rollup window to form the set of aggregated events.

18. The system of claim 11, wherein the processor is further configured to: transmit event metadata of the set of aggregated events to a remote system for purposes of performing grouping of the first and second IoT devices.

19. The system of claim 11, wherein the processor is further configured to: determine that grouping the first and third IoT devices is unsuccessful, and carry out assisted grouping and labeling of the first and third IoT devices.

20. The system of claim 11, wherein the processor is further configured to: determine that a new IoT device label has been added, and perform a new grouping operation to the first and second IoT devices.

21. A computer program product embodied on a non-transitory medium, the computer program product including instructions which, when executed by a computer, cause the computer to carry out a method comprising:

identifying a set of raw events associated with a first Internet of Things (IoT) device in operation;

identifying a context of the first IoT device in operation and enriching at least some raw events in the set of raw events based at least in part on obtained additional contextual information to form a set of enriched events;

aggregating at least some of the raw events included in the set of raw events to form a set of aggregated events;

generating a context-based IoT device grouping model based at least in part on the set of enriched events, the set of aggregated events, and events associated with a second IoT device in operation;

applying the generated context-based IoT device grouping model to determine that a third IoT device belongs to a particular group; and detecting, as an undesired behavior, a deviation by the third IoT device from group behavior, and generating an alert in response.

* * * * *